(12) United States Patent
Cornell

(10) Patent No.: US 6,476,923 B1
(45) Date of Patent: *Nov. 5, 2002

(54) TANDEM PRINTER PRINTING APPARATUS

(76) Inventor: John S. Cornell, 100 Wolfpit Ave., Unit 26, Norwalk, CT (US) 06851

( * ) Notice: Subject to any disclaimer, the term of this patent is extended or adjusted under 35 U.S.C. 154(b) by 0 days.

This patent is subject to a terminal disclaimer.

(21) Appl. No.: 08/770,322

(22) Filed: Dec. 20, 1996

Related U.S. Application Data

(63) Continuation-in-part of application No. 08/659,143, filed on Jun. 5, 1996.

(51) Int. Cl.[7] .................................................. G06F 13/00
(52) U.S. Cl. .................. 358/1.12; 358/1.13; 358/1.15; 358/296; 399/364; 399/384; 399/16
(58) Field of Search .............................. 395/109, 111, 395/112; 355/219, 221, 309, 319; 399/364, 374, 375, 384, 16; 358/1.9, 1.12, 1.13, 1.14, 1.15, 296

(56) References Cited

U.S. PATENT DOCUMENTS

| | | |
|---|---|---|
| 3,536,398 A | 10/1970 | Bhagat |
| 3,580,670 A | 5/1971 | Bhagat |
| 3,862,802 A | 1/1975 | Till |
| 3,940,210 A | 2/1976 | Donohue |
| 3,944,359 A | 3/1976 | Fisk et al. |
| 3,944,360 A | 3/1976 | Deetz et al. |
| 4,120,034 A | 10/1978 | Fisk et al. |
| 4,194,832 A | 3/1980 | Tabayashi |
| 4,348,101 A | 9/1982 | Schonfeld et al. |
| 4,591,884 A | 5/1986 | Miyamoto et al. |
| 4,774,524 A * | 9/1988 | Warbus et al. ............... 358/296 |
| 4,796,066 A | 1/1989 | Morris et al. |
| 4,881,132 A | 11/1989 | Lajos |
| 4,958,187 A | 9/1990 | Tsuchiya et al. |
| 4,972,236 A * | 11/1990 | Hasegawa ................... 355/319 |
| 5,140,674 A | 8/1992 | Anderson et al. |
| 5,144,386 A * | 9/1992 | Matsuo et al. ............... 355/221 |
| 5,179,417 A | 1/1993 | Sugaya et al. |
| 5,467,179 A * | 11/1995 | Boeck et al. ................ 355/309 |
| 5,548,390 A * | 8/1996 | Sugisaki et al. ............ 355/319 |
| 5,568,246 A | 10/1996 | Keller et al. |
| 5,596,416 A | 1/1997 | Barry et al. |
| 6,297,886 B1 * | 10/2001 | Cornell ...................... 358/1.12 |

* cited by examiner

*Primary Examiner*—Mark Wallerson
(74) *Attorney, Agent, or Firm*—R. Neil Sudol; Henry Coleman; William Sapone

(57) ABSTRACT

A printing assembly comprises a first printer for printing documents encoded in computer generated signals and a second printer for printing documents encoded in computer generated signals, the documents including alphanumeric characters, charts and graphics. The printers are disposed one above the other and are connected in tandem to one another via a multiple-page continuous web of paper extending along a U- or C-shaped path from a paper output port of the first printer to a paper feed port of the second printer. A computer for generating a signal encoding a multiple page document is coupled via connection componentry to the printers for transmitting odd pages in encoded form to one of the printers and even pages to the other printer.

20 Claims, 25 Drawing Sheets

TANDEM PRINTER PRINTING APPARATUS

CROSS-REFERENCE TO RELATED APPLICATION

This application is a continuation-in-part of application Ser. No. 80/659,143 filed Jun. 5, 1996.

BACKGROUND OF THE INVENTION

This invention relates to an apparatus for two-sided printing. More particularly, this invention relates to an assembly responsive to computer generated signals for printing a document on two sides.

At the present time, thousands of banks, brokerage houses and other financial institutions are printing millions of weekly, bi-weekly and monthly statements on one side of pre-printed statement forms. For the most part, these statements are printed off of mainframe or large-scale minicomputers. Affordable printers capable of handling mainframe and minicomputer output are either chain or dot-matrix printers. Consequently, printing both sides of paper having the conventional quality would masticate the paper.

Conventional two-sided photocopying and book printing present problems which have perhaps inhibited efforts to develop two-sided printing of financial type statements. Such problems include a warping of the paper which results from the high levels of heat employed. More moisture flees from the side of the paper in contact with the heated elements than from the more remote side of the paper. In addition, the deposition of electrostatic charges causes the paper sheets to cling to one another and to other surfaces. Both the warping of the paper sheets and the deposited electrostatic charge cause paper jams in the machinery. Avoiding or clearing the paper jams requires personnel to be present to monitor and correct problems as they occur. Sometimes, papers printed on one side are placed aside for flattening prior to printing on the opposite side. Such efforts increase costs and delay the production of the desired documents.

OBJECTS OF THE INVENTION

An object of the present invention is provide a printing system or assembly for printing two-sided documents in response to computer-generated signals encoding the documents.

Another object of the present invention is to provide such a system or assembly which can handle mainframe and other large-scale computer output.

A further object of the present invention is to provide such a system or assembly which prints on each side of a sheet of paper in real time.

Yet another object of the present invention is to provide such a system or assembly which can utilize laser printer technology and basic or conventional printer driver programming.

An additional object of the present invention is to provide such a system or assembly which is simple to manufacture, assemble and implement.

These and other objects of the present invention will be apparent from the descriptions and drawings hereof

BRIEF DESCRIPTION

A printing assembly comprises, in accordance with a general embodiment of the present invention, a first printer for printing documents encoded in computer generated signals and a second printer for printing documents encoded in computer generated signals. The documents generally include alphanumeric characters, charts and graphics. A computer for generating a signal encoding a multiple page document is coupled via connection componentry to the printers for transmitting odd pages in encoded form to one of the printers and even pages to the other printer.

The paper used by the printing assembly may be a series of paper sheet portions connected to one another in a continuous web of paper. In that event, the printers are connected in tandem to one another via the multiple-page continuous paper web. The web extends from a paper output port of the first printer to a paper feed port of the second printer.

Preferably, the printers are disposed one above the other, the web of paper being simply inverted in a U or C shape between the output port of the first printer and the paper feed port of the second printer. A tensioning device may be placed in contact with the web between the paper output port of the first printer and the paper feed port of the second printer for guiding the web and providing it with a predetermined amount of tension. The tensioning device exemplarily includes a spring loaded, electrically conductive element such as a roller which is electrically grounded to siphon away electrostatic charge deposited on the paper by the first printer.

Preferably, the connection componentry includes a page splitting module for detecting odd pages and even pages in the document and separating odd pages from even pages. The connection componentry further includes a synchronizer for timing the operation of the first printer and the second printer so that opposite sides of essentially every sheet portion bear consecutive pages. The connection componentry may additionally include an electronic buffer.

In a more specific embodiment of the present invention, the printers are off-the-shelf components, preferably desktop type laser printers.

A device for enabling two-sided printing comprises, pursuant to another embodiment of the present invention, a page-splitting component for detecting odd pages and even pages in a document encoded in a computer-generated signal and for separating odd pages and even pages in the document. A first coupling element connects an input of the page-splitting component to a computer, while a second coupling element connects an output of the page-splitting component to a first printer and a third coupling element connects another output of the page-splitting component to a second printer.

In accordance with another feature of the present invention, a timing module is operatively connected to the page spitting component and at least one of the coupling elements for timing the operation of the printers so that opposite sides of a plurality of paper sheet portions fed from the paper output port of one printer to the paper feed port of the other printer bear consecutive pages. The timing module includes a delay for transmitting pages of a given document over the one coupling element only after lapse of a predetermined interval after an initial transmission of pages of the document over the other coupling element.

In a printing method in accordance with the present invention, a first printer for printing documents encoded in computer generated digital signals is disposed in tandem to a second printer for printing documents encoded in computer generated digital signals. A computer for generating a digital signal encoding a multiple page document is operatively connected to data inputs of the two printers. Odd pages of the multiple page document are then transmitted in encoded form from the computer to one of the printers and even pages of the multiple page document are transmitted from the computer to the other printer. The printers then print the respective even and odd pages on opposing sides of paper sheets which are guided from a paper output port of a first printer to a paper feed port of the other printer.

Generally, the paper sheets are provided in a Z-fold type continuous web. The web extends from the paper output port of the first printer to the paper feed port of the second printer.

Pursuant to a feature of the present invention, the connecting of the computer to the printers includes connecting an output terminal of the computer to an input terminal of a buffer interface and also connecting the buffer interface to the data inputs of the printers. The buffer interface is then operated to detect odd pages and even pages in the document and to separate odd pages from even pages. In addition, the buffer interface is operated to time or synchronize the operation of the printers so that opposite sides of essentially every sheet portion of the paper web bear consecutive pages.

In accordance with another feature of the present invention, the printers are disposed one above the other. Where a continuous web of paper is used, the web is simply inverted in a U or C shape between the output port of the first printer and the paper feed port of the second printer. A guide such as a tensioning roller is placed in contact with the web between the output port of the first printer and the feed port of the second printer. Where the paper sheets are separate, a guide such as an arcuate or curved surface is provided to direct the paper sheets from the first printer to the second printer.

A printing system or assembly in accordance with the present invention is a high-volume printing system which can print customer data, e.g., on financial statements, in real time, using black and white laser printing technology and basic or conventional printer driver programming.

A printing system or assembly in accordance with the present invention reduces the number of sheets of paper necessary to print financial statements by 50% or more, concomitantly reducing printing and mailing costs. In addition, the system eliminates the need to use expensive pre-printed paper stock for financial statements. Logos may be printed on the front of each sheet in real time, while legal compliance information is printed only on the last face of a statement. The quality of the printed characters may be significantly improved over conventional methods of statement printing, up to the highest laser standards. Moreover, development costs can be substantially decreased through the utilization of existing (off-the-shelf) laser printer engines (preferably using powerful RISC processors).

A printing system or assembly for printing two-sided documents in accordance with the present invention can handle mainframe and other large-scale computer output. The printing occurs without essential delay (in real time) in response to computer generated signals. In contrast, in photocopying and other printing methods, there is a substantial delay between printing of one side and printing of the opposing side.

A system or assembly in accordance with the present invention can utilize laser printer technology and basic or conventional printer driver programming.

DESCRIPTION OF THE PREFERRED EMBODIMENT

Figure 1:
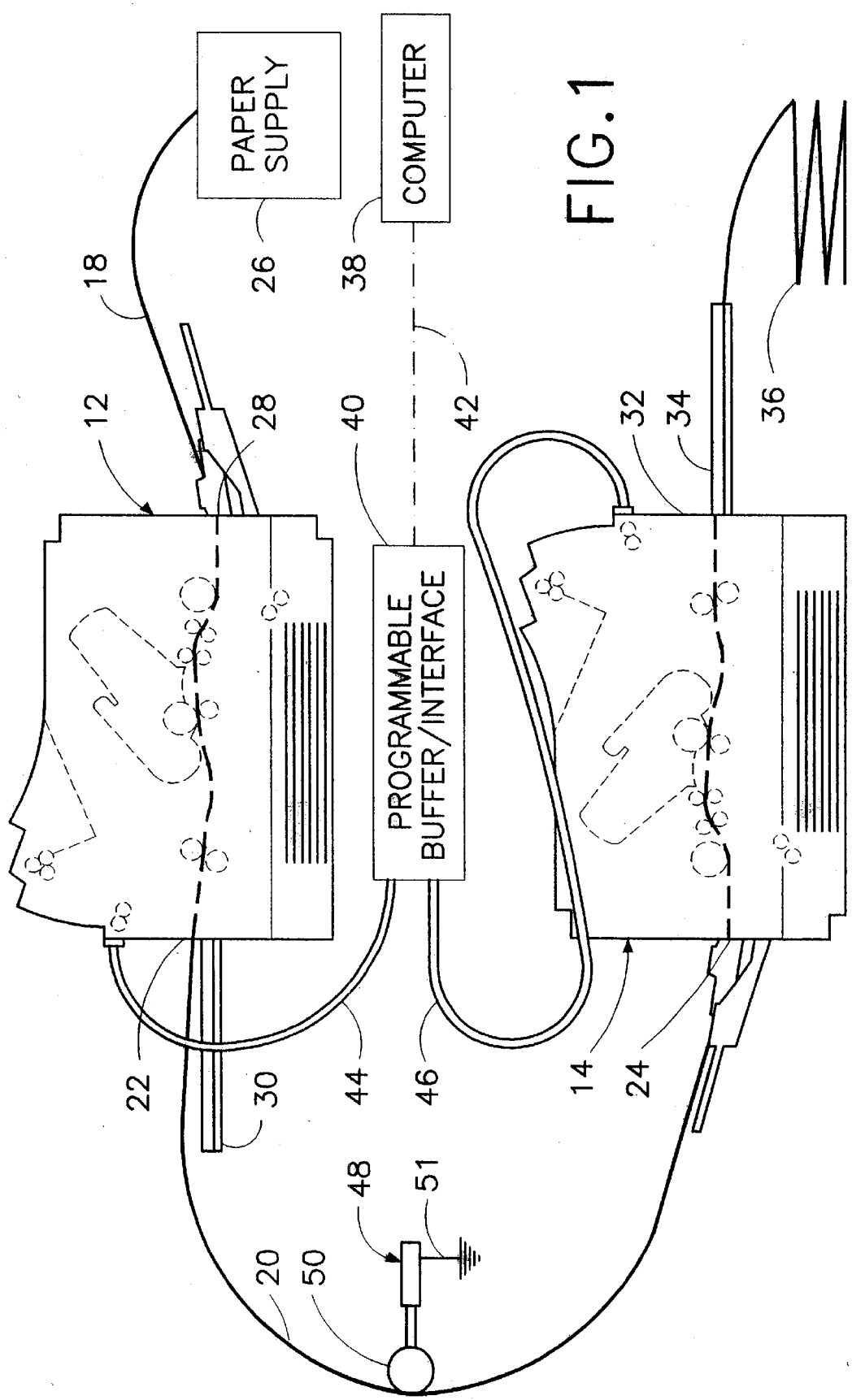
FIG. 1 is a schematic side elevational view, partly in block diagram form, of a printing system in accordance with the present invention, showing two laser printers disposed in cascade with respect to one another.

As illustrated in FIG. 1, a printing assembly or system comprises a pair of printers 12 and 14 disposed one above the other, for example, on shelves of a cart or rack (not illustrated). Printers 12 and 14 are preferably laser printers for printing documents (alphanumeric characters, charts and graphics) encoded in computer generated signals. More specifically, printers 12 and 14 are off-the-shelf desktop-type laser printers.

Printers 12 and 14 are connected in tandem to one another via a multiple-page continuous paper web 18 extending along a U- or C-shaped path 20 from a paper output port 22 of a first printer 12 to a paper feed port 24 of the second printer 14. Paper web 18 is stored in a Z-fold configuration (not shown) in a paper supply container 26 and is fed from that container to a paper feed port 28 of the first printer 12. A micro-switch sensor 29 is provided in printer 12 near paper feed port 28 for detecting whether paper web 18 is properly positioned.

Generally, web 18 comprises a series of sheet portions (not shown) connected end to end. Preferably, the sheet portions of web 18 each bear an end-of-page tab (not shown) at the trailing edge of the respective sheet portion. The end-of-page tabs are magnetically encoded, by means of the ink used to encode banking checks, and are detectible by an end-of-page sensor 31 disposed in printer 12 near paper output port 22 thereof At paper output port 22, a rear door 30 of the first printer 12 is unlatched and left in an opened configuration, to facilitate a guiding of paper web 18 along path 20 so that the paper turns from an upside-up to an upside-down orientation. Similarly, at a paper output port 32 of second printer 14, a rear door 34 of the second printer is kept opened to facilitate a feeding of the paper web 18 to a Z-fold stack 36. Printer 14 is provided with a micro-switch sensor 37 near paper feed port 24 for detecting whether paper web 18 is properly positioned, while an end-of-page sensor 39 is disposed in printer 14 near paper output port 32 thereof for detecting magnetically encoded end-of-page tabs at the trailing edges of the successive sheet portions of web 18. End-of-page sensors 31 and 39 replace the page break sensor (not illustrated) which is standard on laser jet printers. Of course, switches or other sensors (not shown) provided in printers 12 and 14 for disabling the printing process when doors 30 and 34 are opened are themselves disabled, bypassed or otherwise neutralized to enable the execution of printing operations.

As further illustrated in FIG. 1, the printing assembly or system also comprises a mainframe, desktop, mini, or LAN server computer 38 which, in addition to other normal functions, generates a digital signal encoding a multiple page document such one or more ganged bank or financial statements. Computer 38 is coupled to printers 12 and 14 via a programmable buffer/interface 40. Buffer/interface 40 is connected at an input to computer 38 via a cable 42 for receiving, from the computer, the digital signal encoding the multiple page document. Buffer/interface 40 detects page breaks in the document and determines which pages are odd and which are even. Pursuant to that determination, buffer/interface 40 transmits odd pages to a data input of printer 12 over a cable 44 and even pages to a data input of printer 14 over a cable 46.

As additionally illustrated in FIG. 1, a tensioning device 48 is placed in contact with paper web 18 between paper output port 22 of printer 12 and paper feed port 24 of printer 14, for providing web 18 along path 20 with a predetermined amount of tension. Tensioning device 48 includes a spring loaded, electrically conductive roller 50 which is electrically grounded at 51 to remove electrostatic charge deposited on paper web 18 by printer 12. Tensioning device 48 may be designed to collapse upon experiencing pressure in excess of a predetermined safety limit. In that event, both printers 12 and 14will be idled and an appropriate error condition will be displayed (see display 106, FIG. 5).

Figure 2:
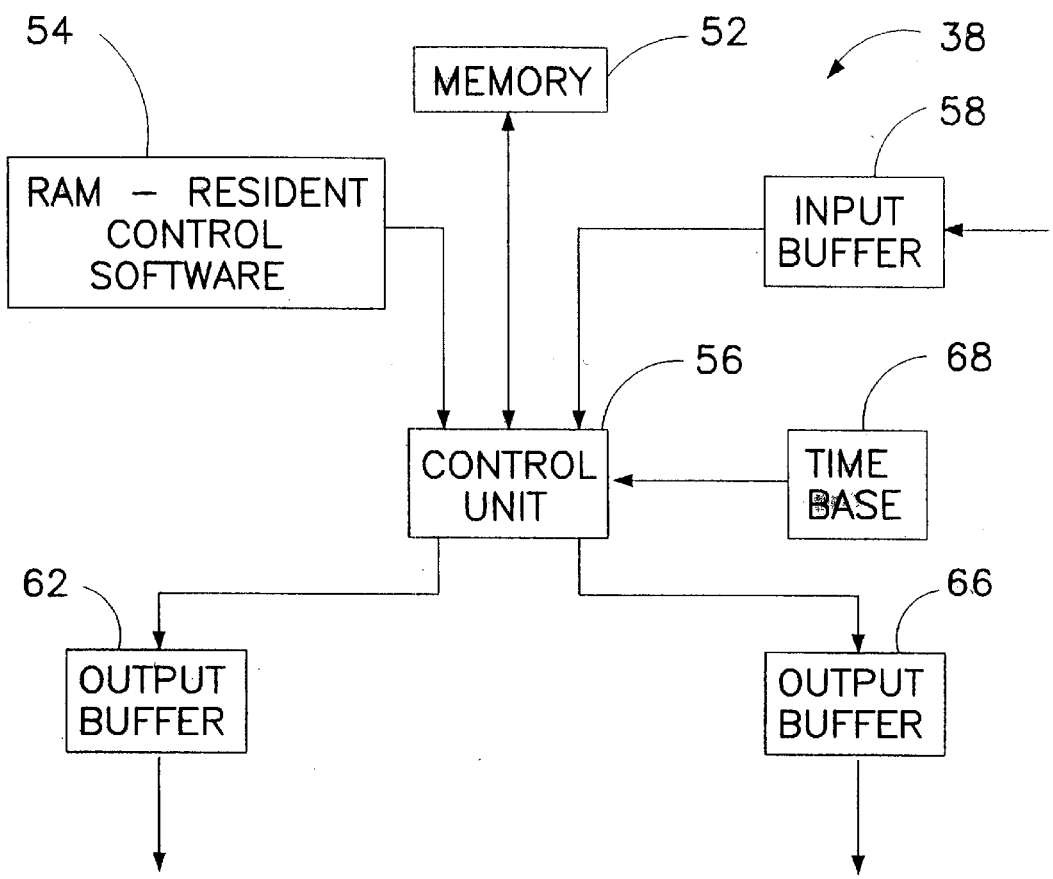
FIG. 2 is a block diagram of a programmable buffer/interface shown in FIG. 1.

As shown in FIG. 2, buffer/interface 40 includes a memory 52 which stores decoding instructions for different types of computers and different database programs. In response to instructions from RAM resident control software 54, a control unit 56 accesses memory 52 to enable the control unit to detect different pages of the multiple page document received by buffer/interface 40 from computer 38 over cable 42. The incoming multiple page document is temporarily stored in a buffer 58 which, together with cable 42, couples computer 38 to control unit 56.

Figure 3:
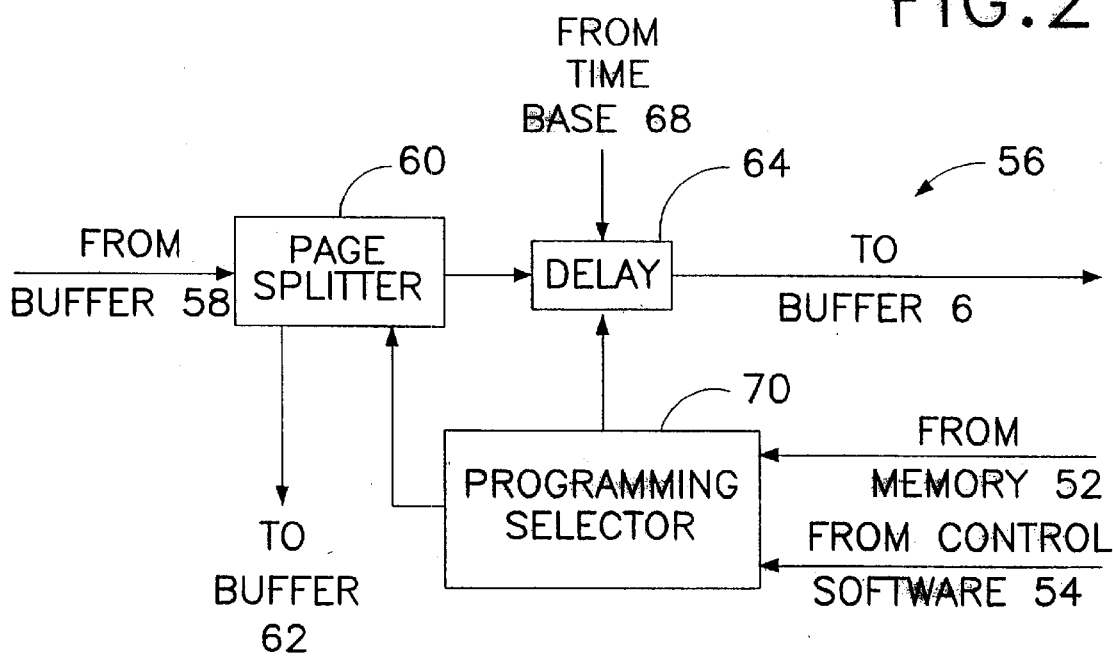
FIG. 3 is a block diagram of a control unit shown in FIG. 2.

As depicted in FIG. 3, control unit 56 includes a page splitting module 60 which detects and splits the odd pages from the even pages in the multiple page document generated by computer 38. Page splitter module 60 feeds the odd pages in sequence to printer 12 via an output buffer 62 (FIG. 2) and feeds the even pages in sequence to printer 14 via a delay 64 (FIG. 3) and an output buffer 66. Buffers 62 and 66, together with cables 44 and 46, couple page splitter module 60 to printers 12 and 14.

Under the control of a timing signal from a time base 68, delay 63 postpones the transmission of the even page sequence to printer 14 by an interval substantially equal to the transit time of paper web 18 from paper output port 22 of printer 12 to paper feed port 24 of printer 14, thereby synchronizing the operation of the two printers so that opposite sides of essentially every sheet of web 18 bear consecutive pages.

As further depicted in FIG. 3, control unit 56 includes a programming selector 70 which selects prestored document decoding instructions from memory 52 in response to a selection made by RAM-resident software 54. Software 54 senses and communicates to programming selector 70 the type of machine that computer 38 is or the type of operating system used by computer 38, as well as the identity of the database or word processing program which computer 38 uses to generate the multiple page document. This information permits control unit 56 and, more specifically, programming selector 70 and page splitter 60 to analyze the multiple page document for page breaks.

RAM-resident software 54 may also be used to inform control unit 56 of the type of printers connected to buffer/interface 40 and possibly an approximate distance along path 20 from output port 22 to paper feed port 24. The input of the approximate distance along path 20 enables control unit 56 to modify the timing of the second printer's operation relative to the first printer's operation. To that end, programming selector 70 is connected to delay 64, as depicted in FIG. 3.

Figure 4:
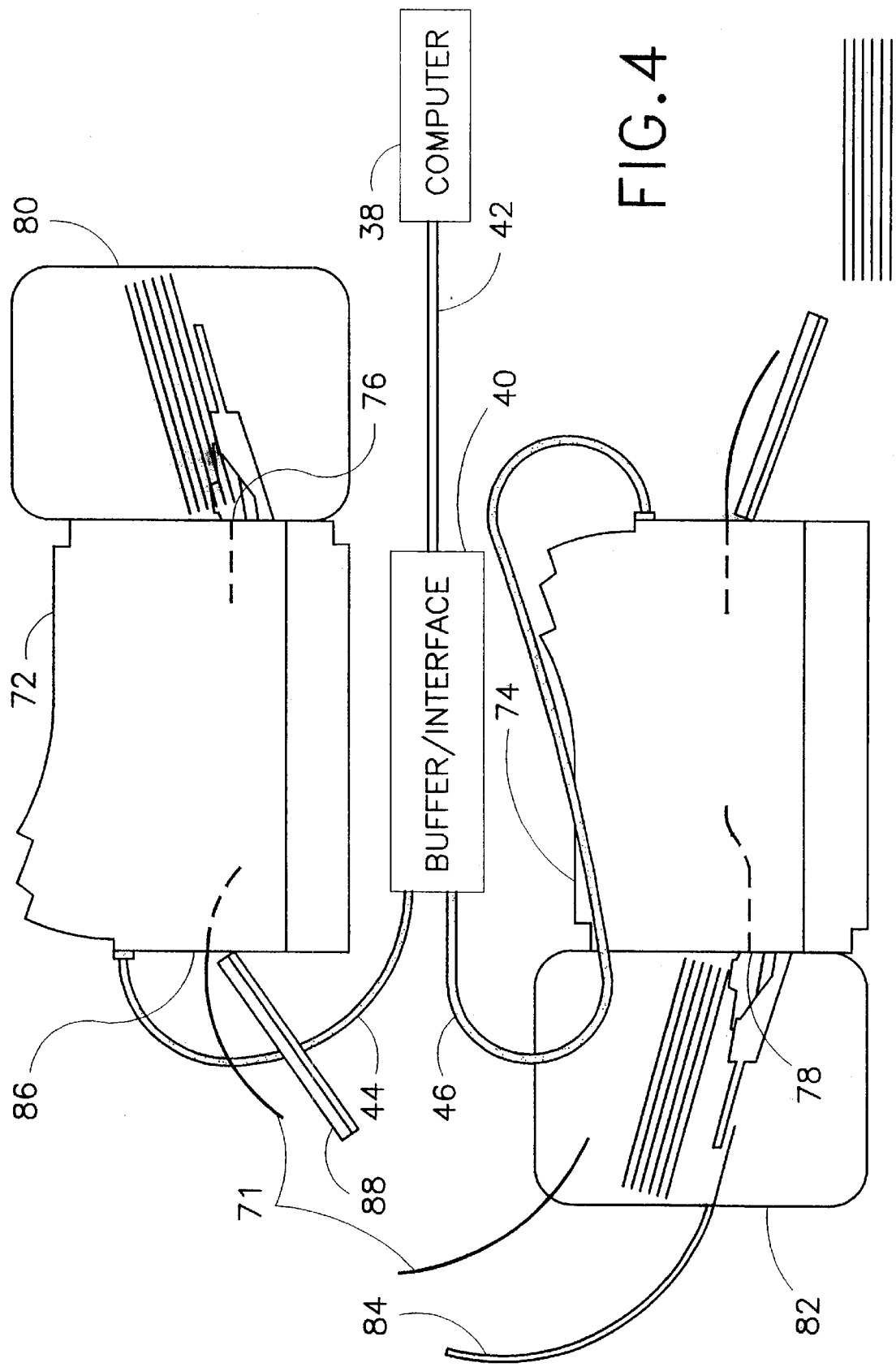
FIG. 4 is a schematic side elevational view, partly in block diagram form, of a modified printing system in accordance with the present invention.

FIG. 4 illustrates another printing assembly or system for two-sided printing on separate paper sheets 71 comprises a pair of printers 72 and 74 disposed one above the other on shelves of a cart or rack (not illustrated). Printers 72 and 74 are essentially identical to printers 12 and 14 except that printers 72 and 74 are provided at their paper input ports 76 and 78 with respective paper stackers 80 and 82 and at their paper output ports 86 with standard page-break sensors (not shown), rather than end-of-page sensors 31 and 39 (FIG. 1). In addition, the second printer 74 is provided with an arcuate paper guide or surface 84 removably attached to paper stacker 82 for guiding paper sheets 71 from a paper output port 86 of printer 72 to stacker 82 so that the paper sheets are turned over in transit from output port 86 to input or feed port 78. A door 88 at output port 86 is angled downwardly and also serves a paper guiding function. Otherwise, the assembly of FIG. 4 is structurally essentially identical to the assembly or system of FIG. 1. Like reference numerals in FIGS. 1 and 4 denote identical structural components.

Figure 5:
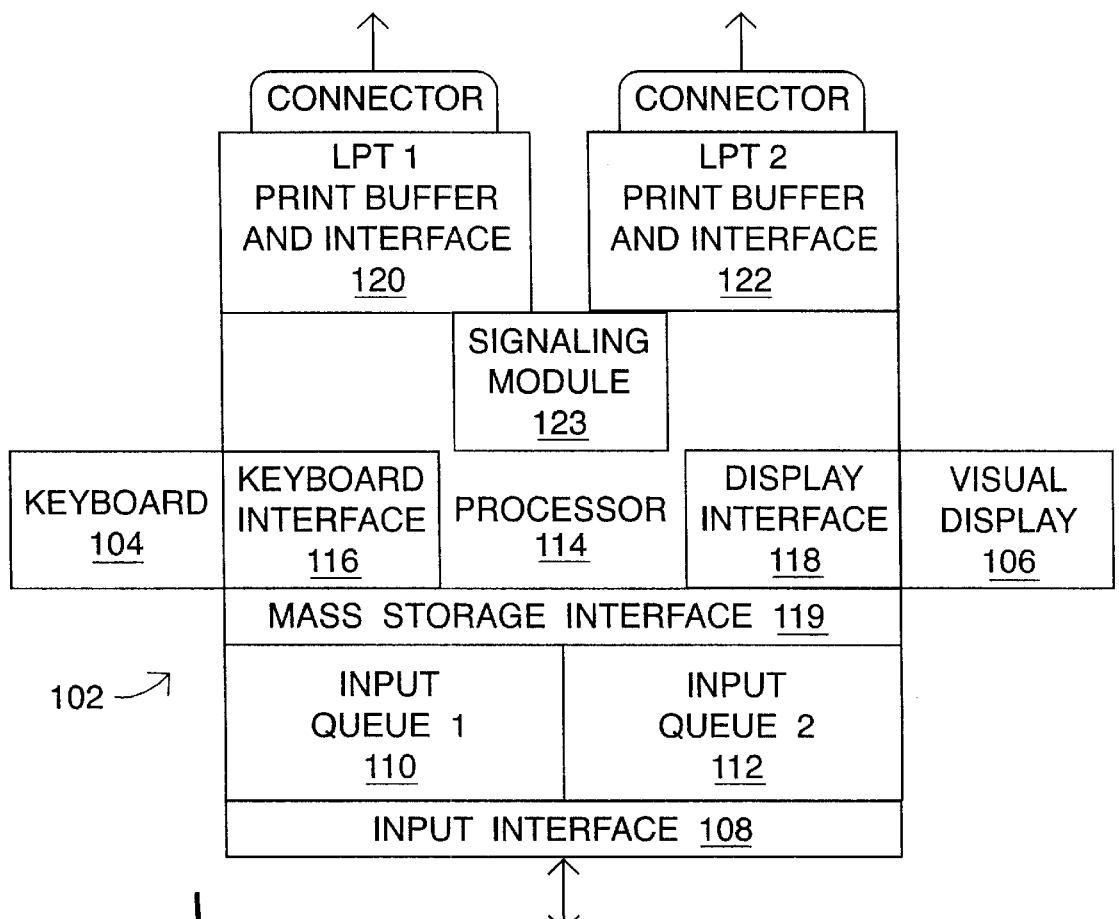
FIG. 5 is a block diagram of a computer unit utilizable to perform the functions of the programmable buffer/interface of FIGS. 1 and 4.

FIG. 5 depicts a computer unit 102 with a keyboard 104 and a visual display 106. Computer unit 102 is an alternative embodiment of the programmable buffer/interface 40 of FIGS. 1 and 4. Computer unit 102 includes an input interface 108 connected to mainframe, desktop, mini, or LAN server computer 38 (FIGS. 1 and 4) for receiving therefrom a multiple page document such one or more ganged bank or financial statements. The incoming document is loaded into one of two mass storage components or input queues 110 and 112, under the control of a processor component 114 of computer unit 102. Processor 114 communicates with keyboard 104 and display 106 via respective interface modules 116 and 118 and with input queues 110 and 112 via a mass storage interface 119. Processor 114 includes an internal RAM (not illustrated) with resident control software.

Computer unit 102, more particularly, processor 114, performs several operations on a multiple page document which has been loaded into input queue 110 or 112. Processor 114 detects odd pages and even pages in the document, separates odd pages from even pages, and transmits odd pages of the document to laser printer 12 or 72 and even pages of the document to laser printer 14 or 74. Processor is additionally programmed to synchronize operation of the odd-page laser printer 12 or 72 and the even-page laser printer 14 or 74 so that opposite sides of essentially every sheet bear consecutive pages. It is also contemplated that computer unit 102 or processor 114 actively generates the ultimate printed pages by combining encoded information from computer 38 peculiar to a particular document with predetermined standard textual and graphic information incorporated into a plurality of different documents. For example, processor 114 will combine individual financial statement data such as banking transactions with standard text and graphics including logos, headings, dates and legally required information.

Processor 114 is programmed to delay page transmission to the even-page laser printer 14 or 74 by a predetermined number of pages. The length of the delay depends chiefly on the distance between the paper output port of the first printer and the paper infeed port of the second printer.

As further illustrated in FIG. 5, computer unit 102 also includes a first print buffer, LPT1 print buffer 120 (with interface), for temporarily storing a document page to be transmitted to the first laser printer 12 or 72. Five second print buffers 122 (with interface), individually labeled LPT2 print buffers A–E, are provided for temporarily storing a plurality of document pages to be transmitted to the second laser printer 14 or 74. Processor 114 has a signaling module 123 which interfaces with print modules 120 and 122.

Print buffers 120 and 122 are preferably areas of processor memory dedicated to output page storage. Print buffers 122 are one greater in number than the number of pages by which printing in the second printer 14 or 74 is delayed relative to the start of printing in the first printer 12 or 72.

Figure 6:
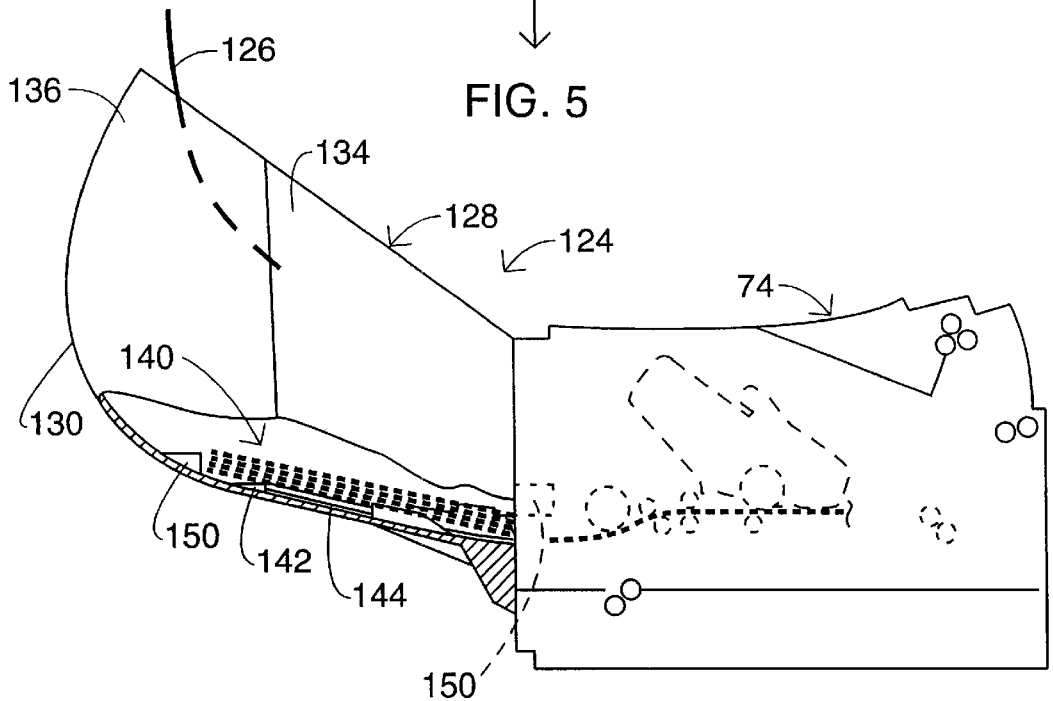
FIG. 6 is a schematic side elevational view of a modified second printer of a pair of ganged or cascaded printers shown in FIG. 4.
Figure 7:
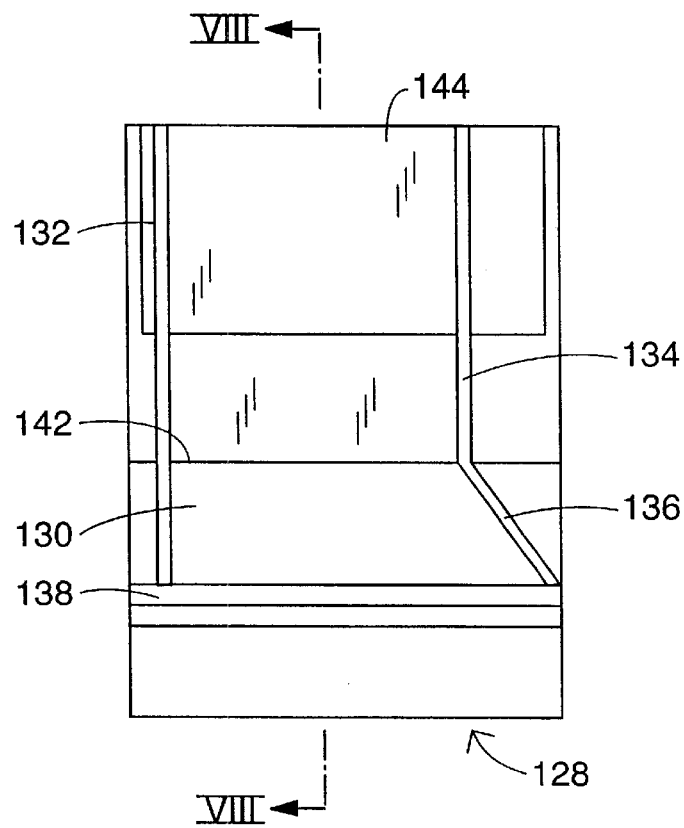
FIG. 7 is a schematic top plan view of a paper guide at a paper input port of the printer of FIG. 6.
Figure 8:
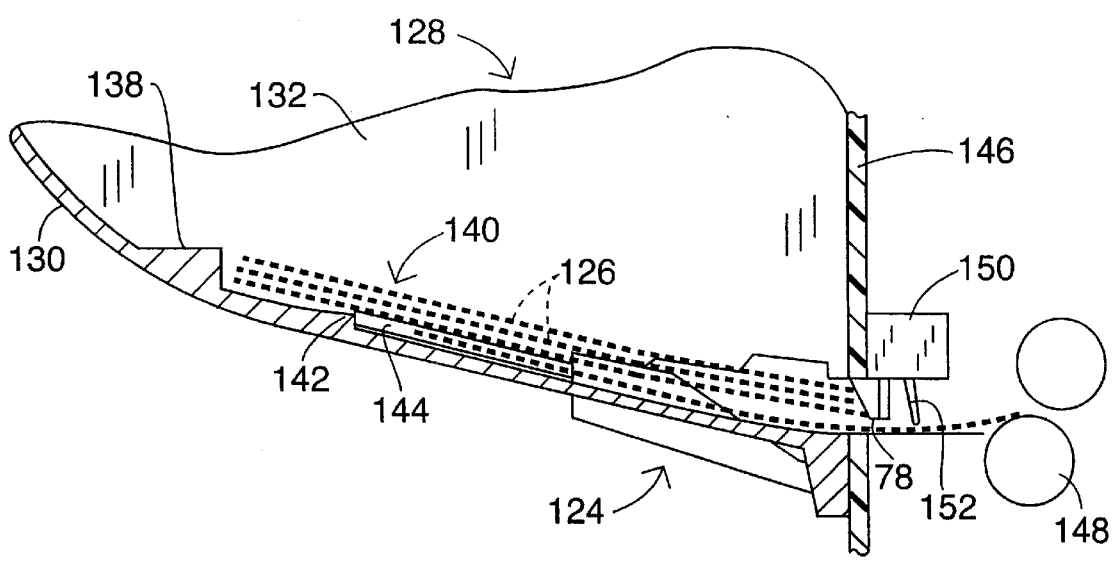
FIG. 8 is a schematic partial cross-sectional view taken along line VIII-VIII in FIG. 7, on an enlarged scale, showing the paper guide and paper infeed port of the printer of FIG. 6.

FIGS. 6–8 illustrate a modified paper infeed assembly 124 for printer 74. Sheets of paper 126 which drop from paper output port 86 of printer 72 (FIG. 4) are caught by a paper stacker or guide 128 attached to printer 74. Paper guide 128 includes an arcuate back and lower wall 130 and a pair of vertical side walls 132 and 134 (FIG. 7). Side wall 134 is laterally shiftable to accommodate paper sheets 126 of different widths. An upstream end portion 136 of side wall 134 is angled laterally outwardly to provide a "funnel" effect. Along an inner surface (not labeled) wall 130 is provided with a large step 138 defining the rear end of a stacking zone 140. Wall 130 is further provided along its inner surface with a small step 142 which abuts a rear edge of a pre-existing paper tray 144.

As shown in FIG. 8, paper sheets 126 are fed one sheet at a time through paper infeed port 78 (see also FIG. 4). Port 78 is just wide enough to accept one sheet only of twenty to twenty-eight pound laser printing paper. On an inner side of a printer rear wall 146 are disposed a gripper roller 148 and a sensor 150. Gripper roller 148 rises to pull a single paper sheet 126 through port 78. The infeed of that sheet is detected by sensor 150 via a pivoting of a trigger or microswitch lever 152. Upon the passage of a paper sheet 126 past roller 148 and sensor 150, trigger 152 falls and sensor 150 transmits a signal to the main electronic module (not illustrated) of printer 74. The main electronic module in turn signals gripper roller 148 to shift to a lowered position to enable gravity feed of the next paper sheet.

Figure 9:
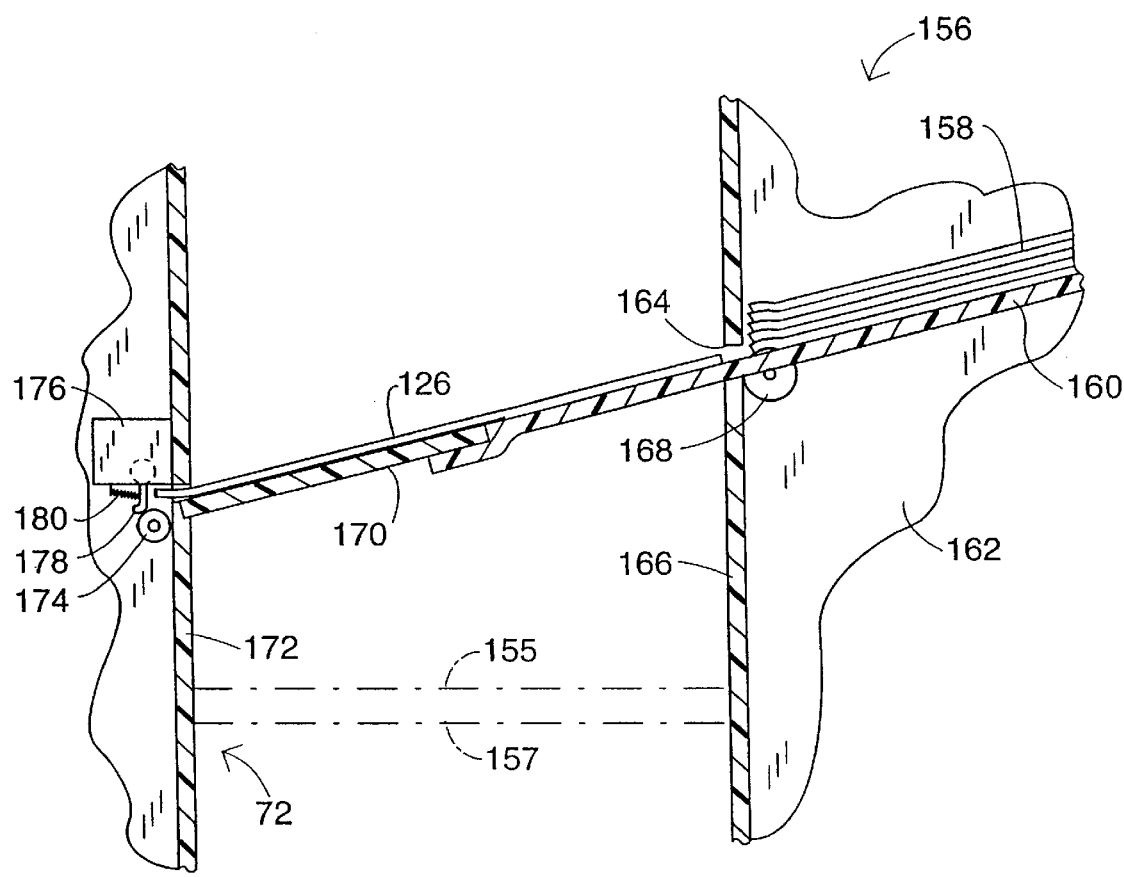
FIG. 9 a schematic partial cross-sectional view, on an enlarged scale, of a modified paper supply or stacker, a paper guide, and a paper infeed port of a first printer of the pair of ganged or cascaded printers of FIG. 4.

FIG. 9 illustrates a portion of a modified paper supply or stacker 156 provided at an input to printer 72 (see also FIG. 4). Staiker 156 is electrically connected to printer 72 via a power cable 155 and a signaling cable 157. A stack 158 of paper sheets 126 is disposed on a feed ramp or guide plate 160 of a stacker frame 162. The paper sheets 126 are delivered one at a time through an opening or slot 164 between a front face 166 of stacker frame 162 and feed ramp 160. In response to a signal from the main electronics (not shown) of printer 72, a motor-driven gripper roller 168 feeds a single paper sheet 126 through opening or slot 164. Under the control of the main electronics of printer 72, gripper roller 168 is lowered to position the next sheet for feeding and subsequently raised to prevent the next sheet from slipping down into the feed path.

At a lower end, feed ramp 160 abuts an upper end of a printer paper tray 170. Paper tray extends to a paper input port 76 (see also FIG. 4) where, on an inner side of a printer panel 172, are disposed a gripper roller 174 and a sensor 176 with a trigger 178 loaded by a coil spring 180. Gripper roller 174 and sensor 176 function similarly to roller 148 and sensor 150.

Figure 10A:
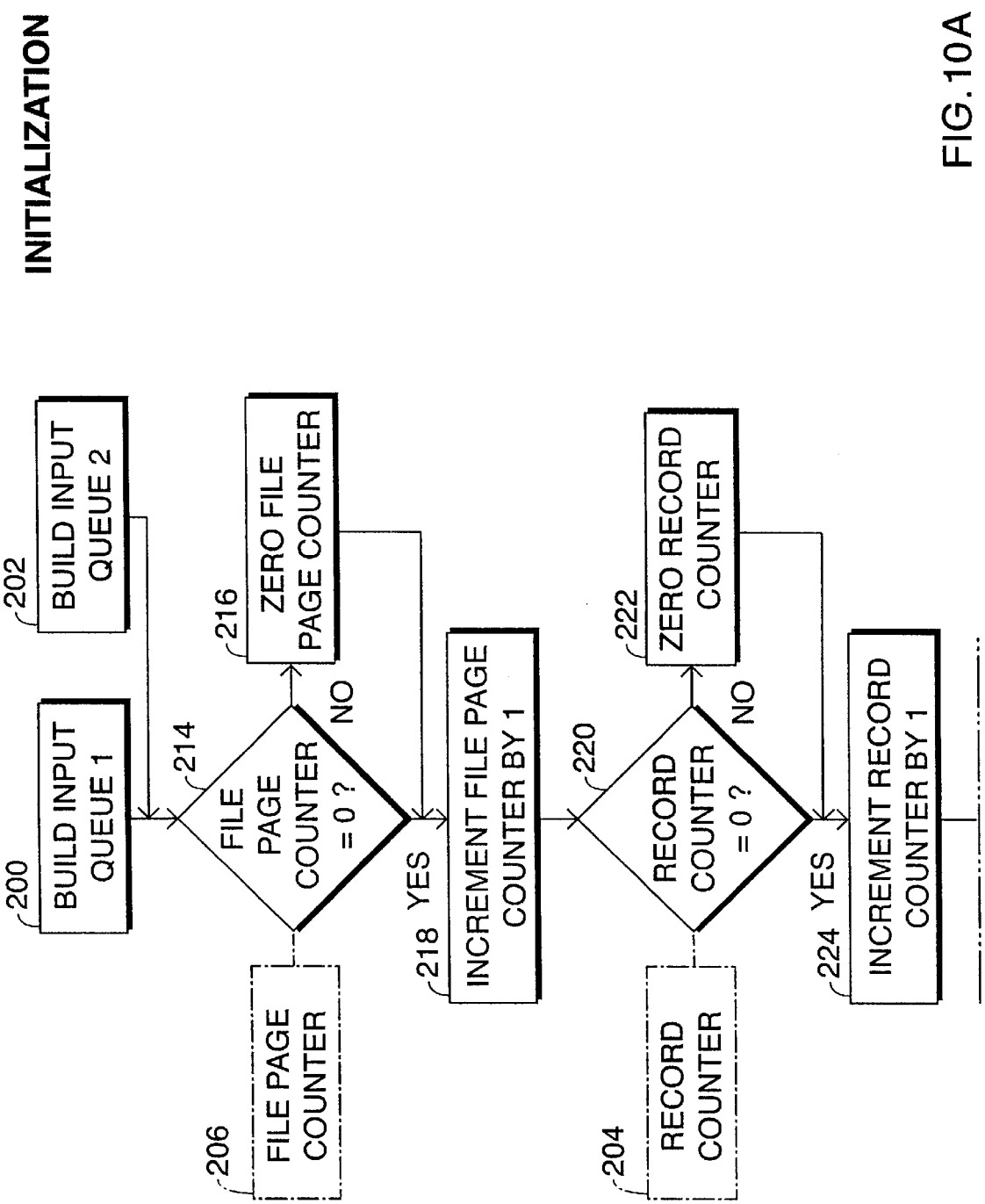
FIGS. 10A–10S are interconnected portions of a block diagram illustrating operations of the computer unit of FIG. 5, and more particularly a processor component of the computer unit.
Figure 10B:
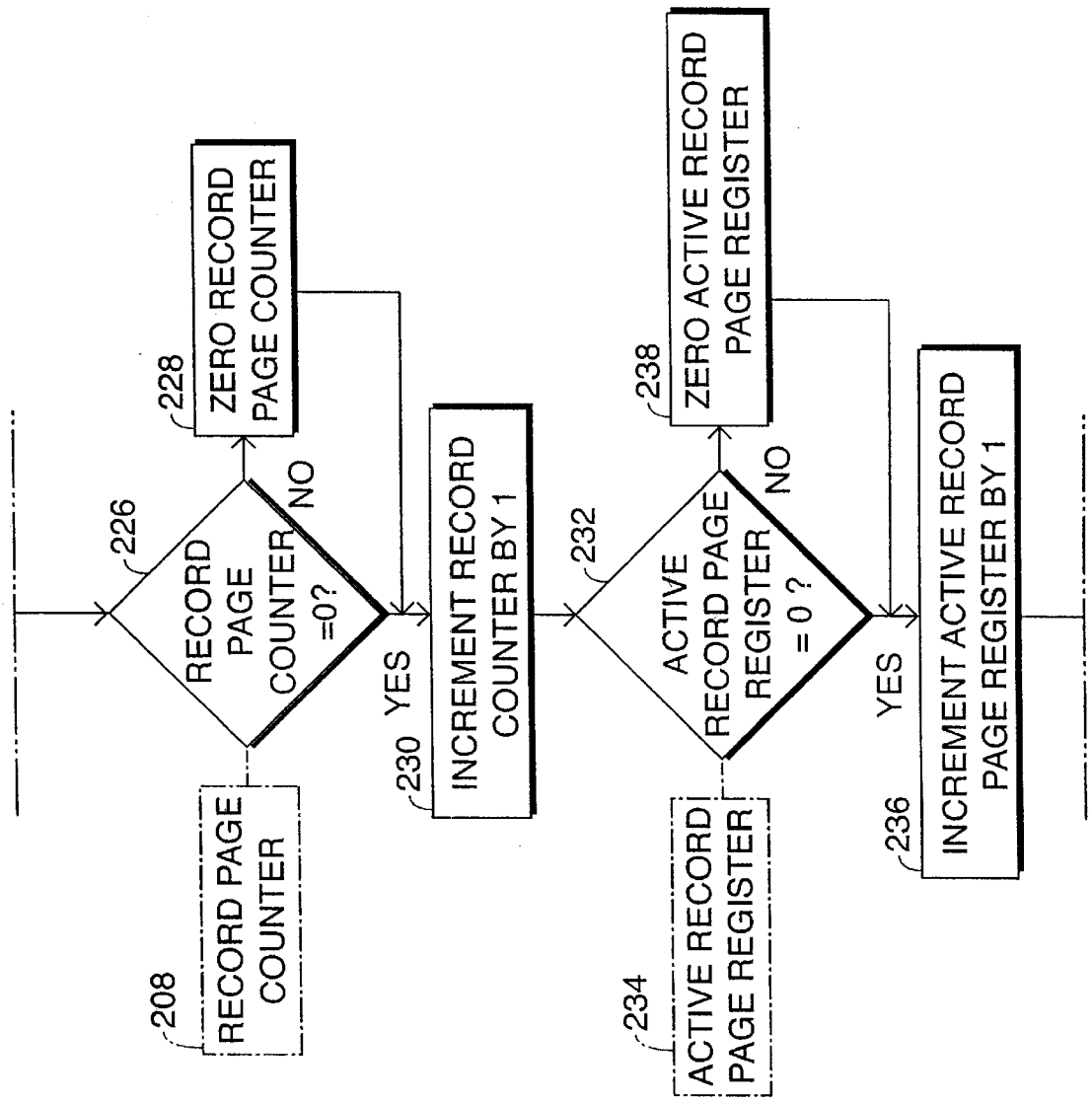
Figure 10C:
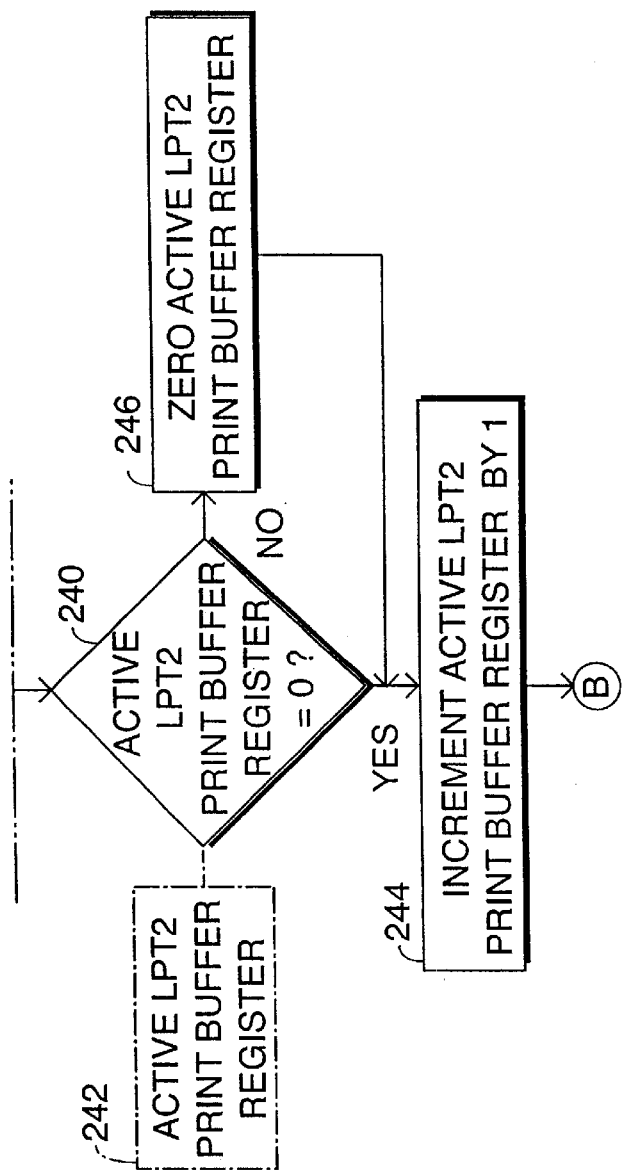
Figure 10D:
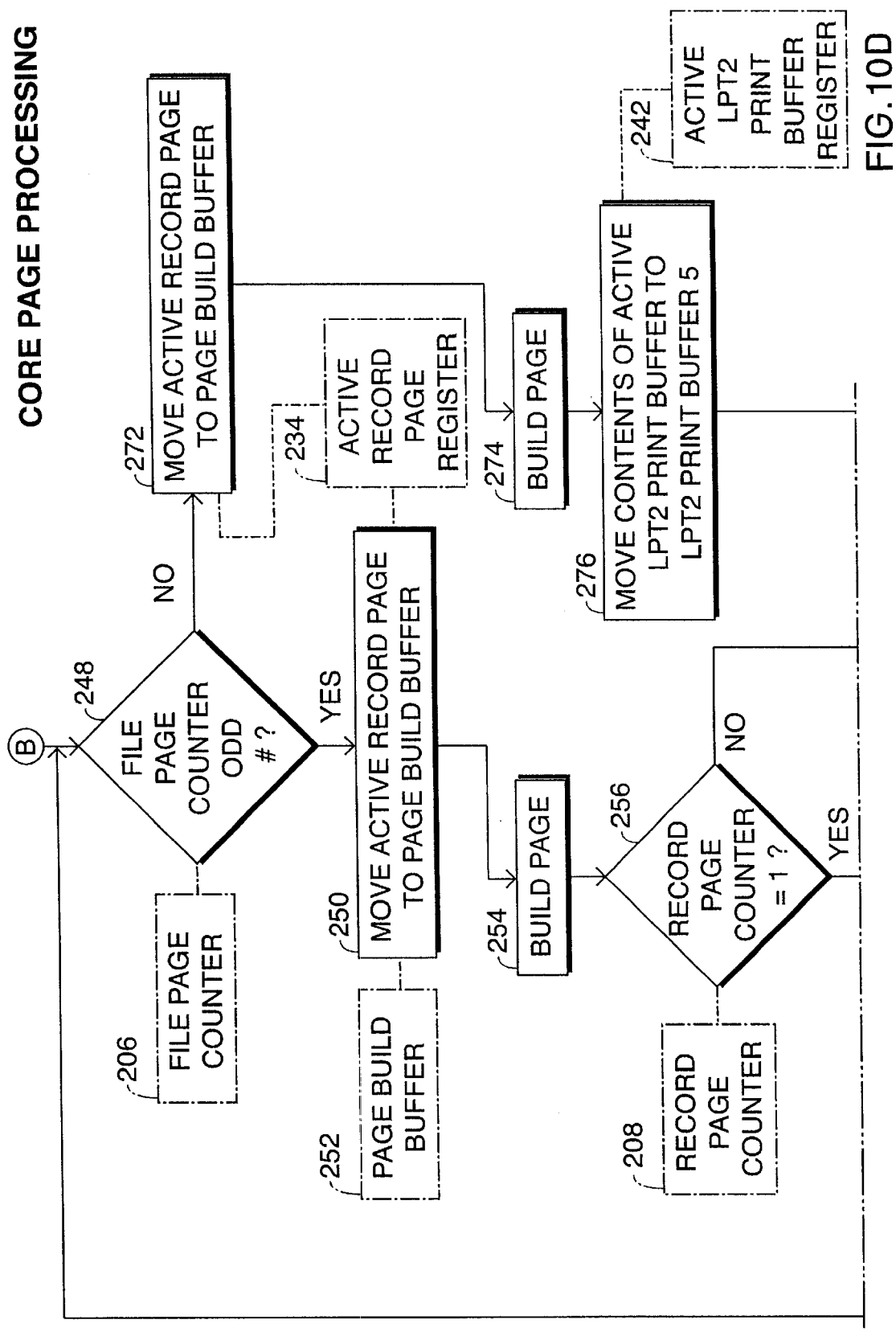
Figure 10E:
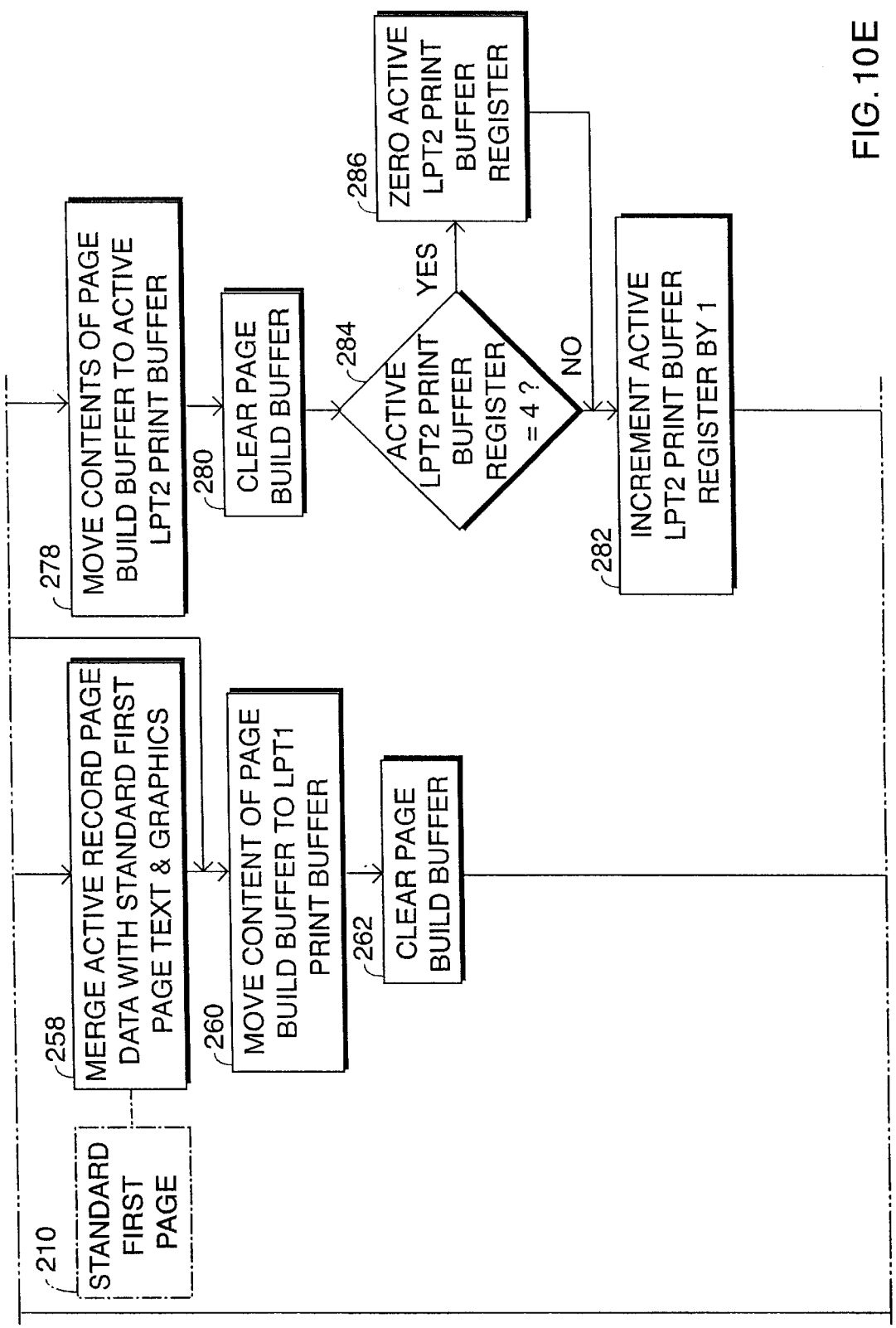
Figure 10F:
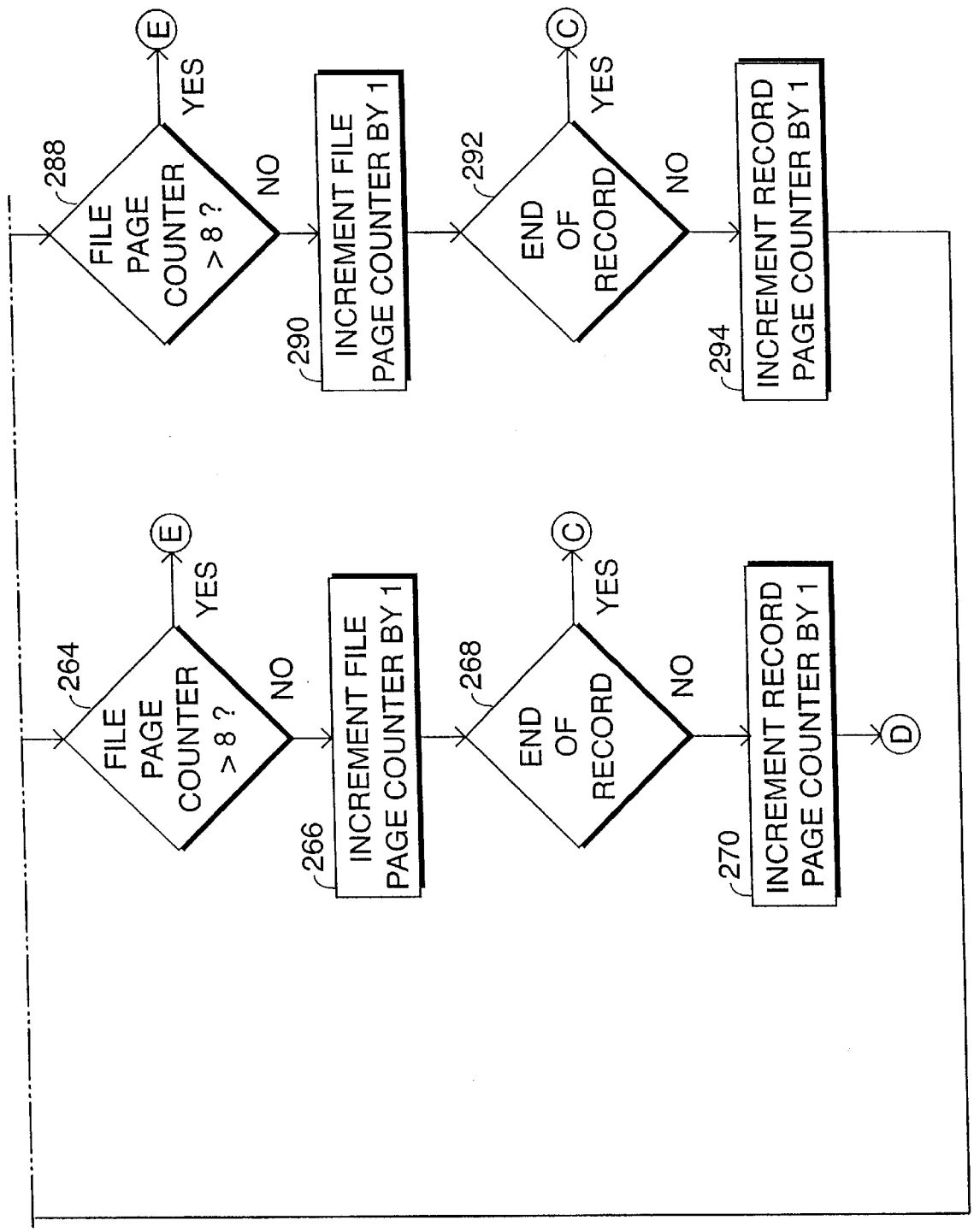
Figure 10G:
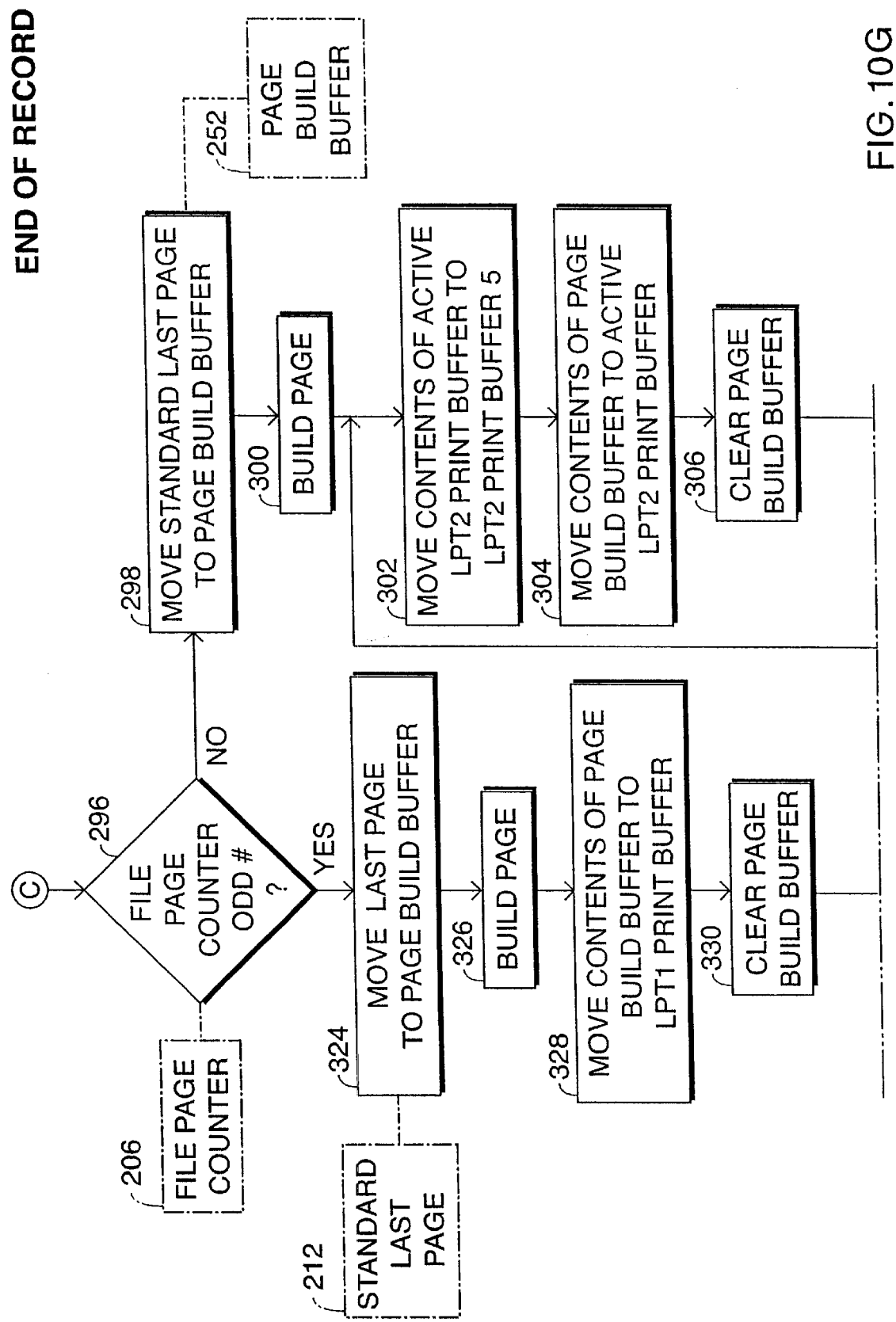
Figure 10H:
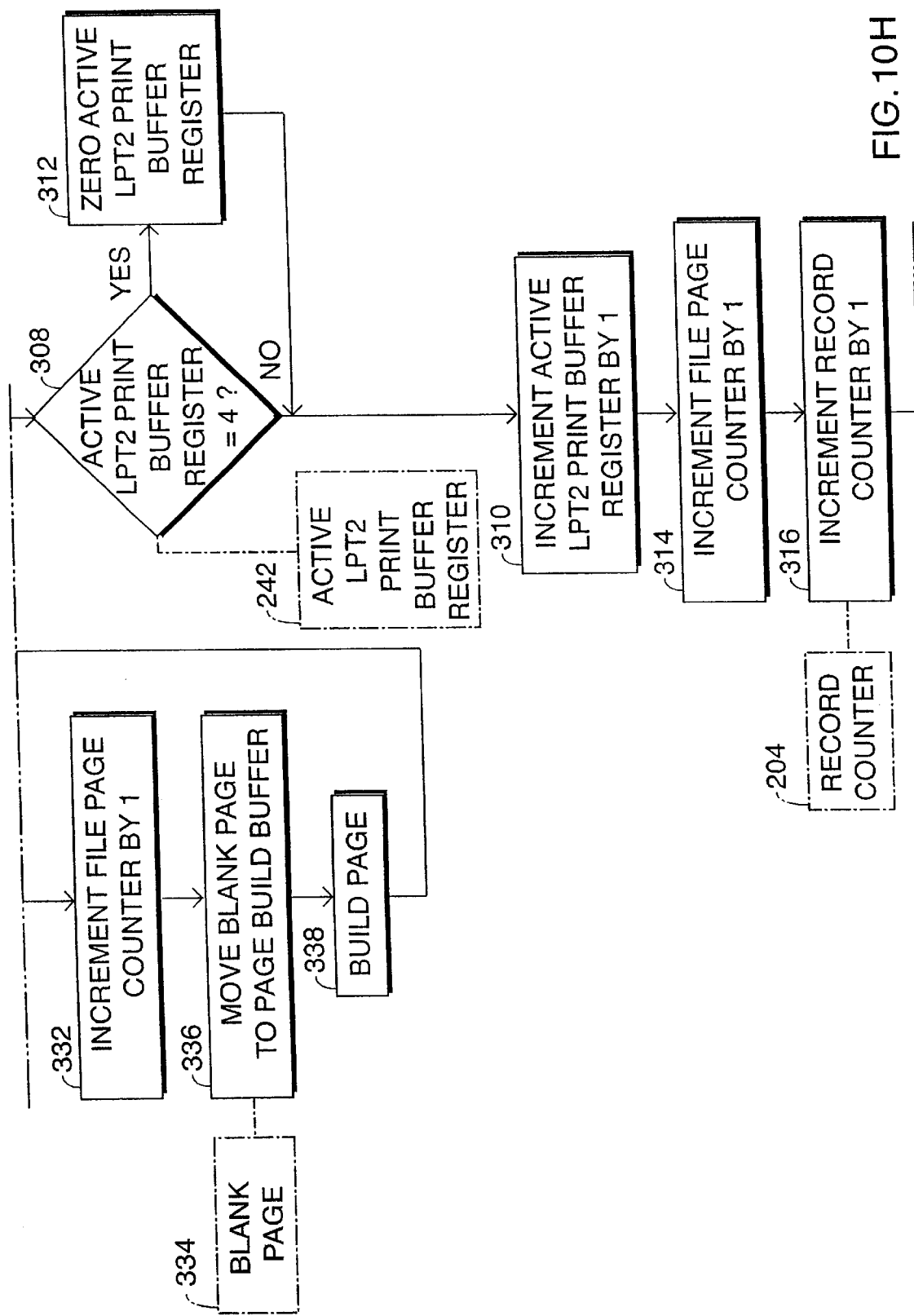
Figure 10:
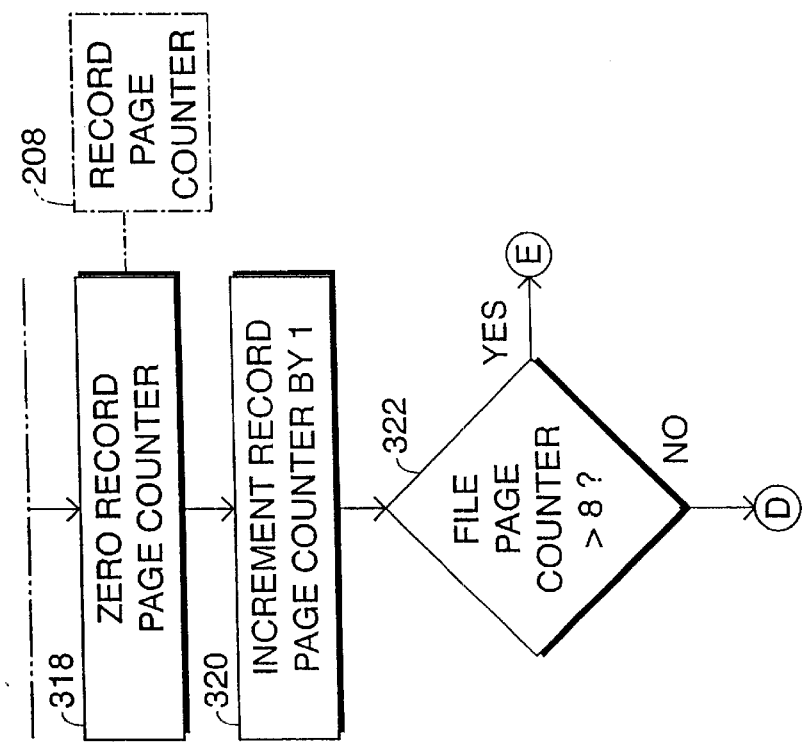
Figure 10J:
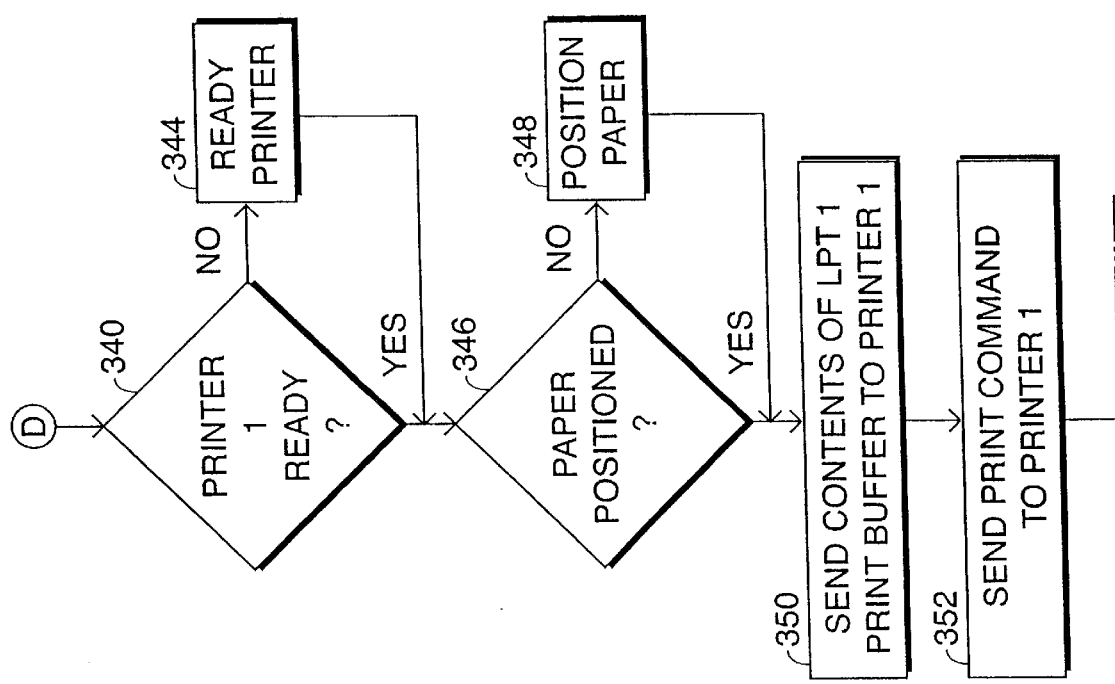
Figure 10K:
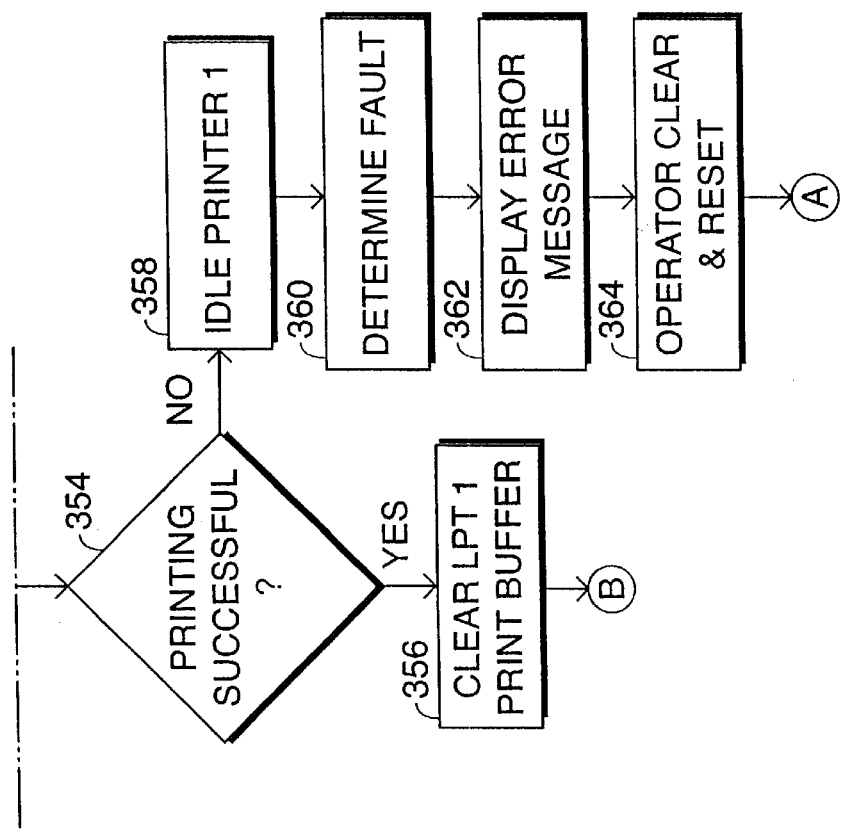
Figure 10L:
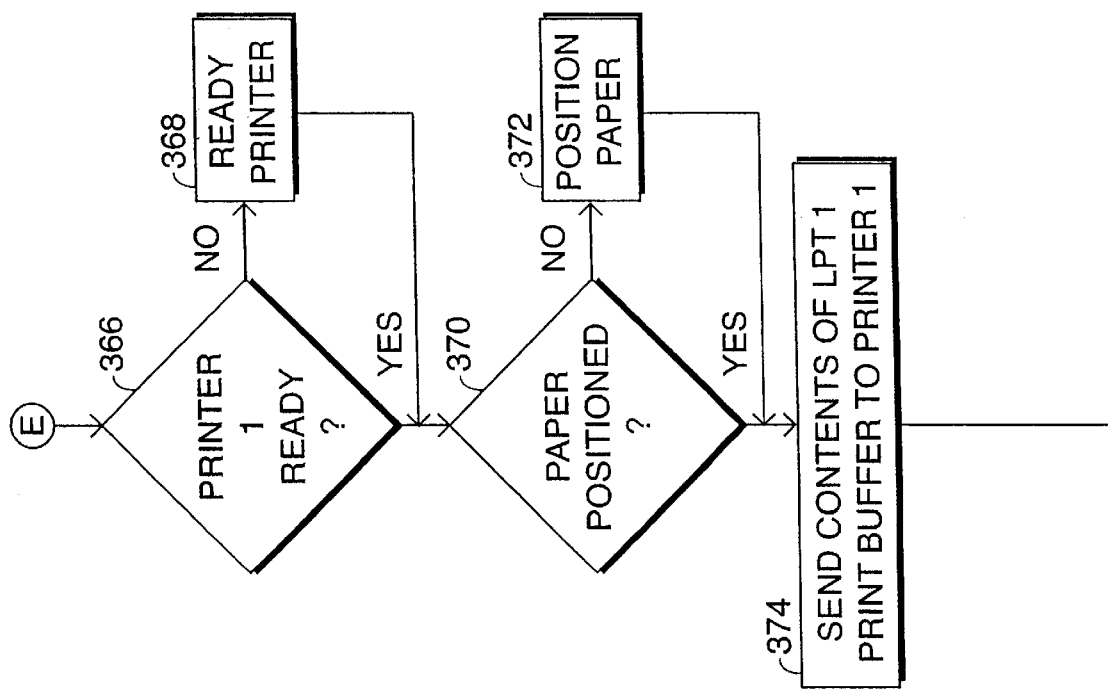
Figure 10M:
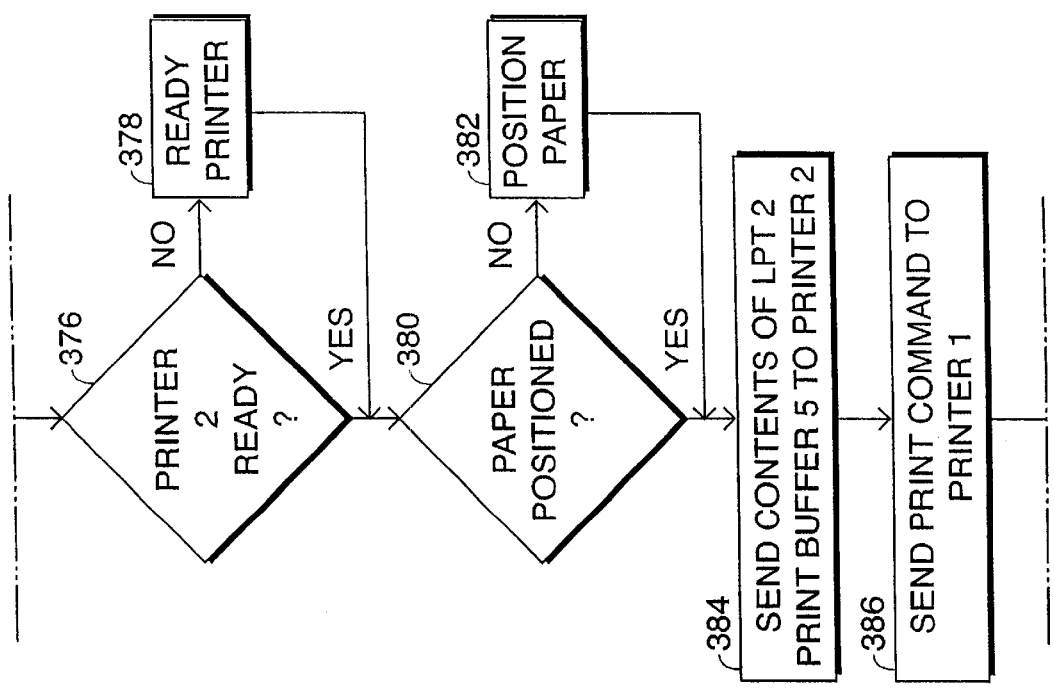
Figure 10N:
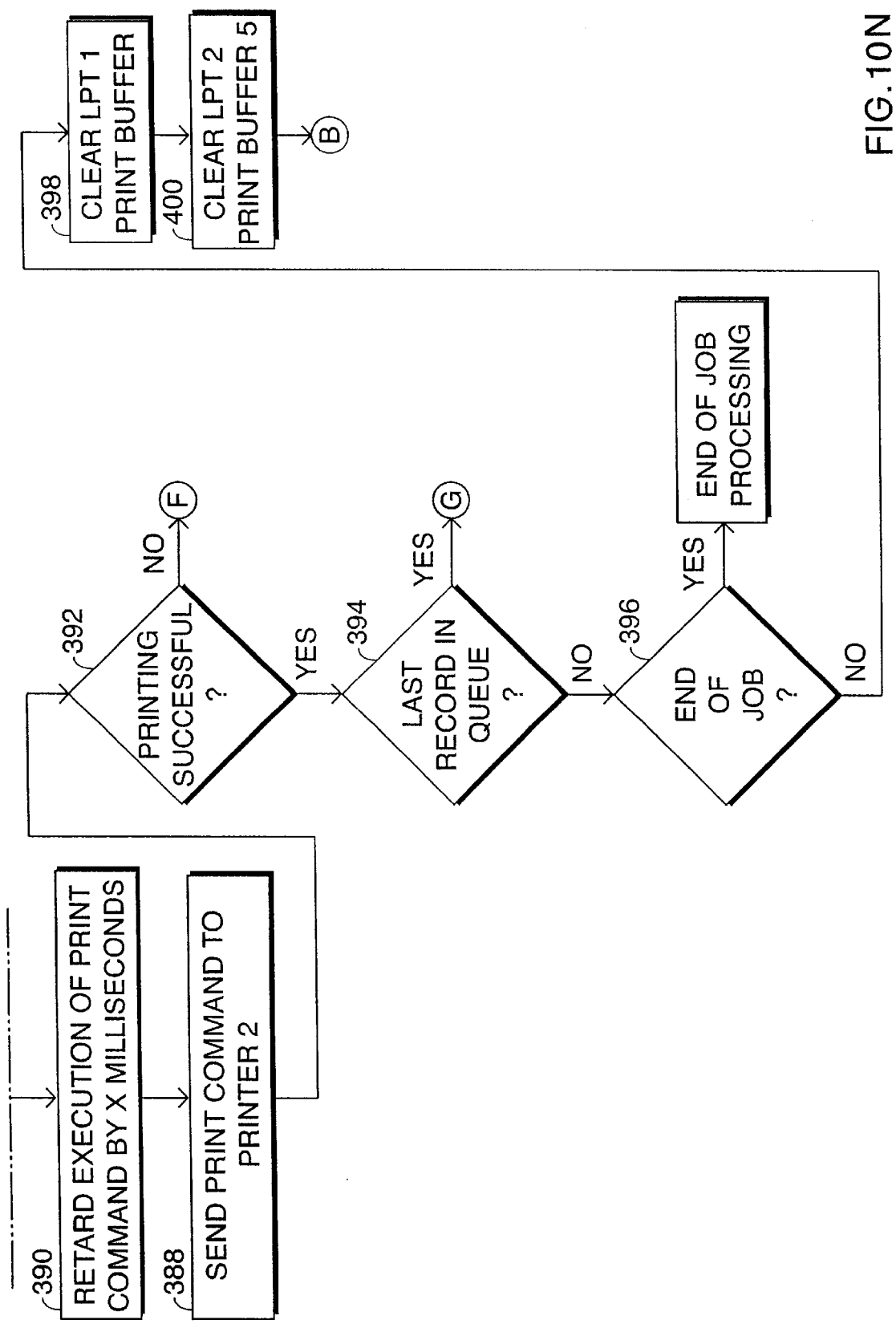
Figure 10O:
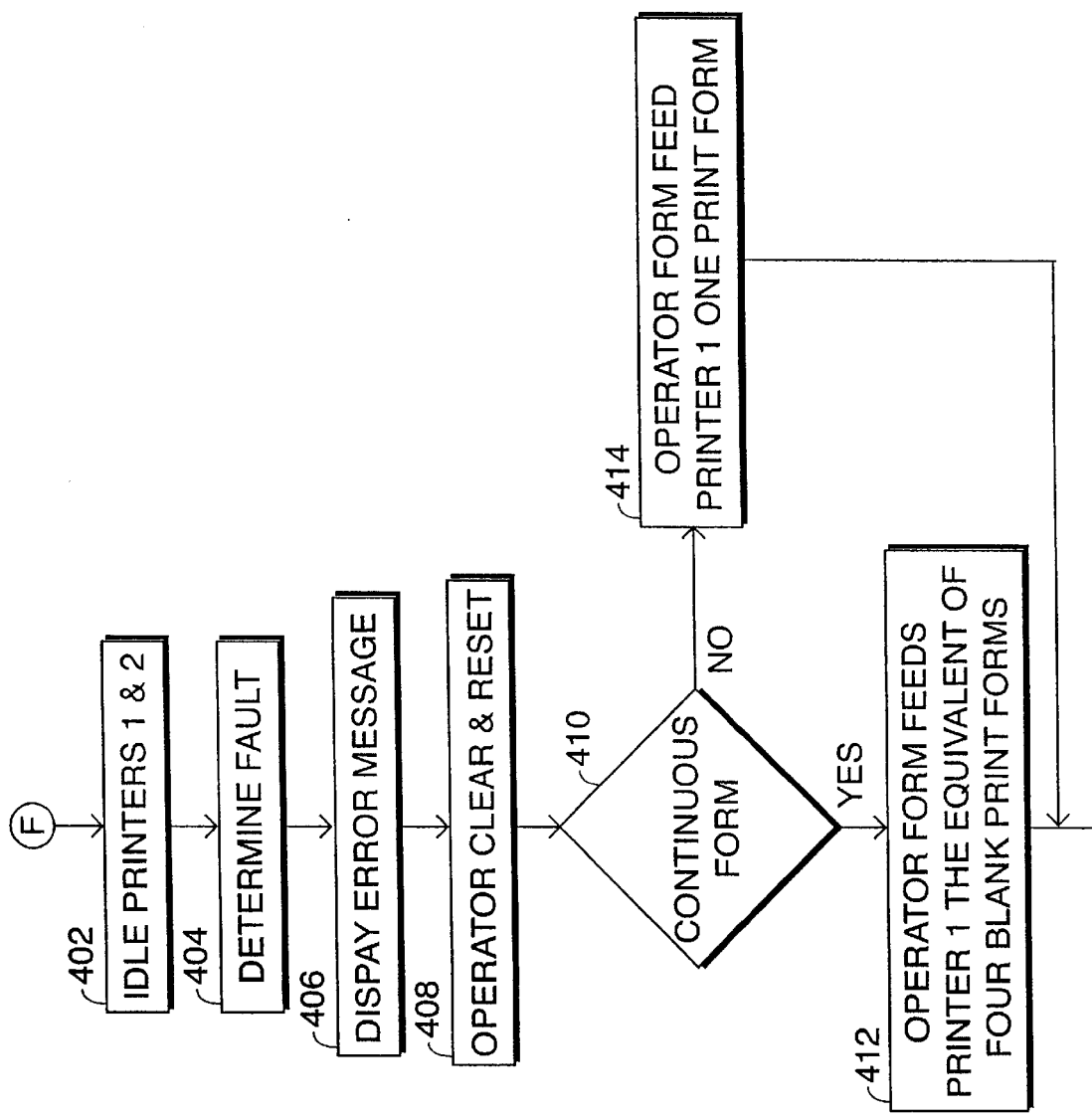
Figure 10P:
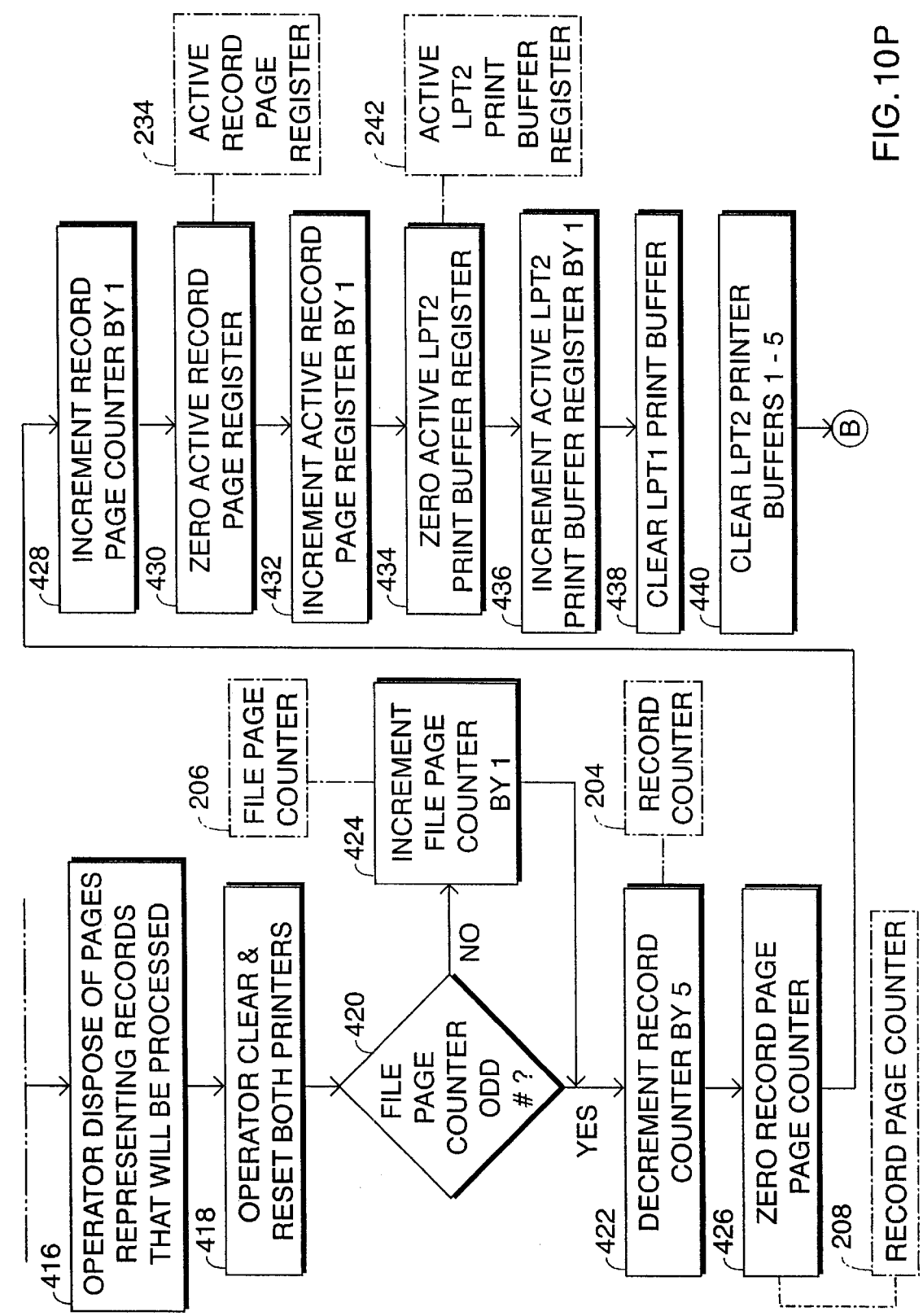
Figure 10Q:
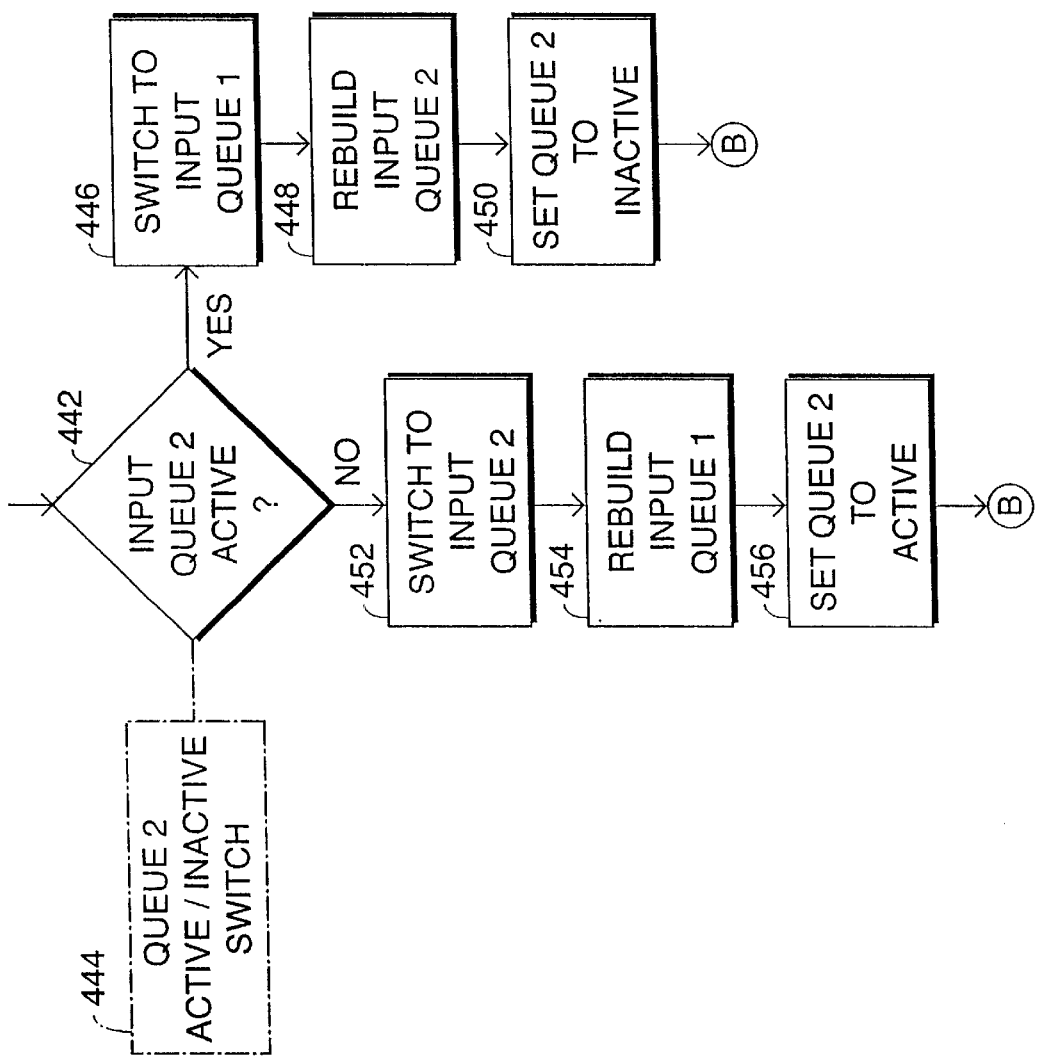
Figure 10R:
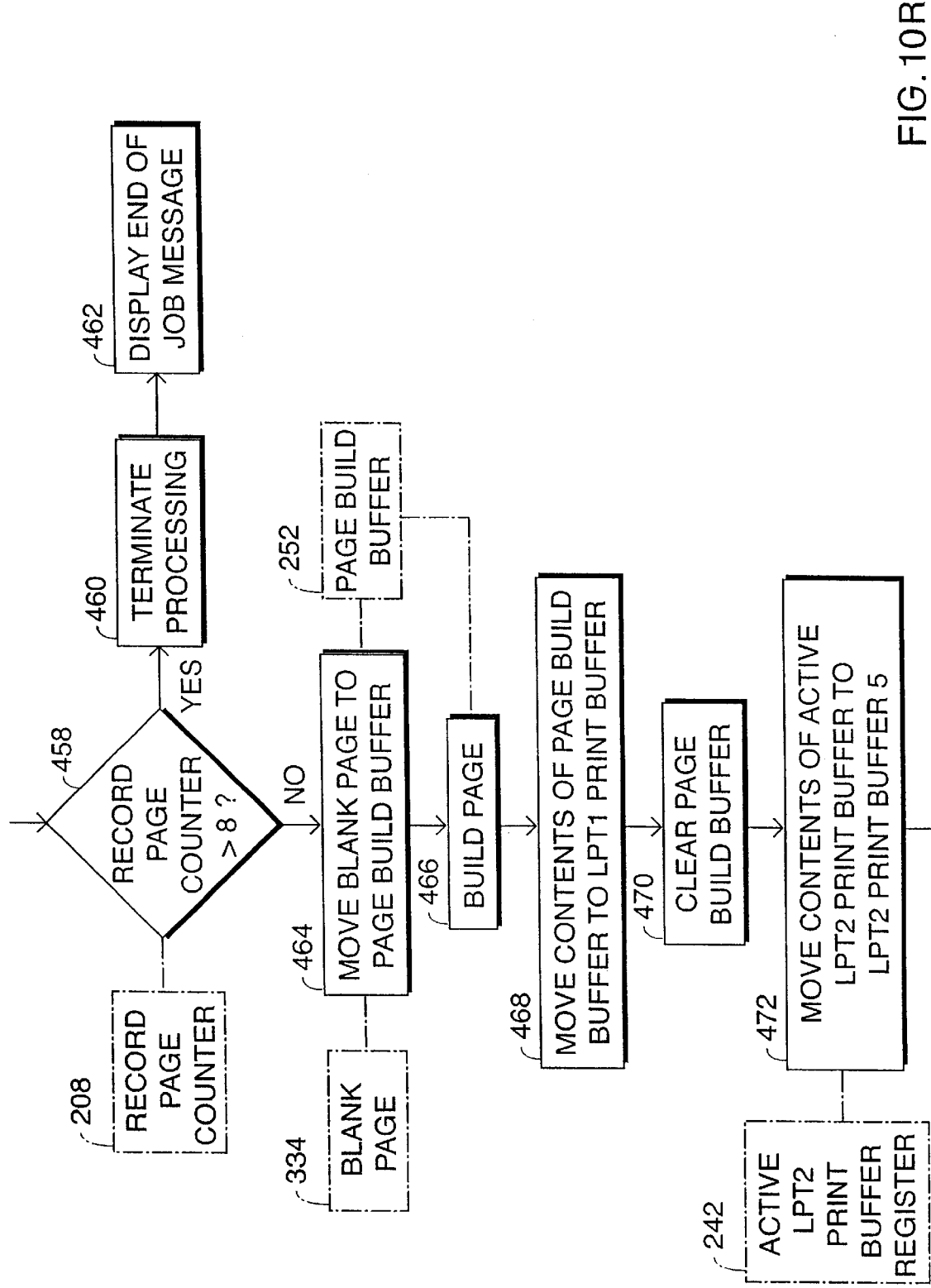
Figure 10S:
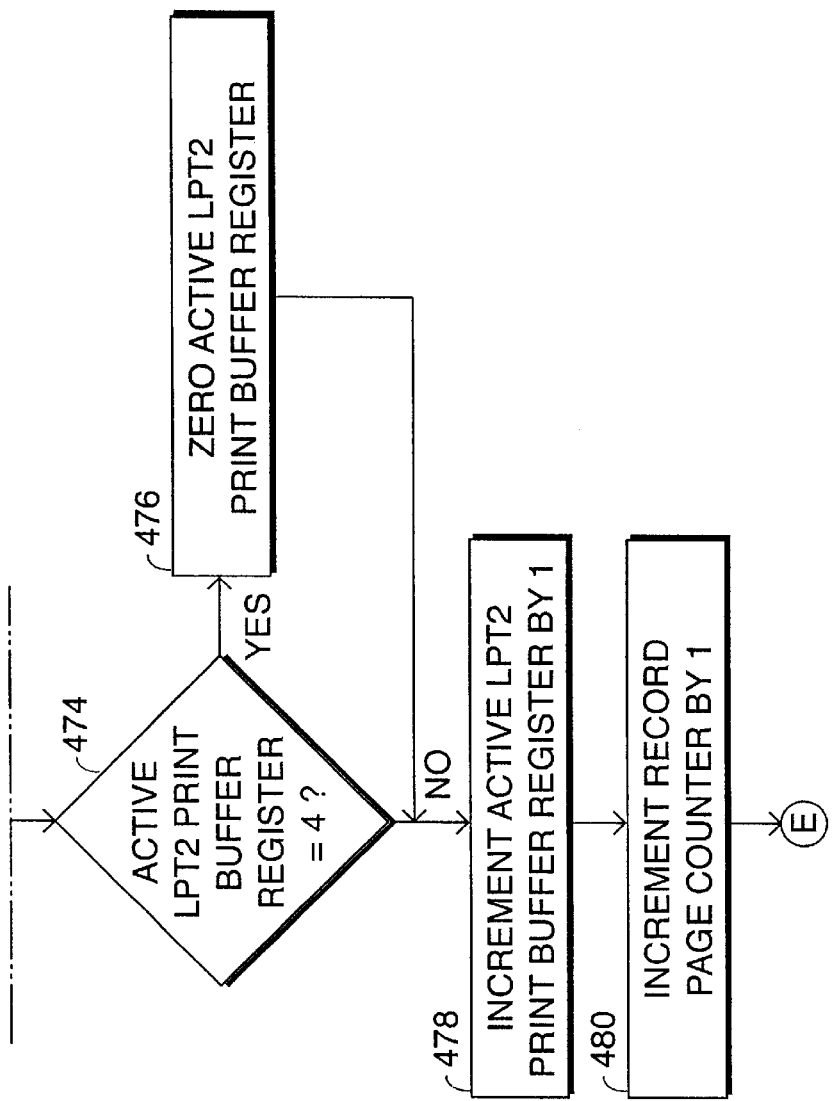

FIGS. 10A–10S generally illustrate respective subroutines in the operation of processor 114. FIGS. 10A–10C relate to general initialization procedures. FIGS. 10D–10F concern core page processing operations. FIGS. 10G–10I are directed to steps undertaken at the end of each record in a print file. FIGS. 10J and 10K depict printing operations using just one printer (for example, during the first several pages of a pint job). FIGS. 10L–10N involve printing operations utilizing both printers. FIGS. 10O and 10P relate to procedures for correcting printing errors. FIG. 10O deals with steps performed at the last record of a print file. FIGS. 10R–10S show processing operations at the end of a print job.

Upon initialization, processor 114 oversees the loading of print files into queues 110 and 112 (FIG. 5), as indicated at steps 200 and 202 in FIG. 10A. Each print file includes a multiplicity of documents or records. In the printing of bank financial statements, the records constitute lists of bank financial transactions which have occurred during a month period (the statement period). Each record includes at least one page of the print file and more frequently includes more than one page. Processor 114 must track the succession of records as they are being printed. To that end, processor 114 has a record counter 204 (see FIG. 10A) in a defined area of internal memory. For each page to be printed, processor 114 must also track the file page number and the record number. Accordingly, processor 114 has a file page counter 206 and a record page counter 208 as reserved areas of internal memory.

Among the operations executed by processor 114 are (1) merging standard text and graphics, stored in internal memory areas 210 (FIG. 10E) and 212 (FIG. 10G), with the individual record data, (2) determining the first and last page of each record in a print file, (3) synchronizing or timing the printing in the two printers 12, 14 or 72, 74, and (4) transmitting print data to the printers to enable printing. As mentioned above, the main subroutine for controlling the printing operations is illustrated in FIGS. 10L–10N, while print initialization operations are shown in FIGS. 10J–10K. The synchronization or timing of printing in the two printers 12, 14 or 72, 74 is accomplished by using LPT2 buffer registers 122 (FIG. 5) to delay the feeding of even pages to the second printer 14 or 74 essentially by the time required for a paper sheet to travel from paper infeed port 28 or 76 of the first printer 12 or 72 to the paper infeed port 24 or 78 of the second printer 14 or 74. The delay thus depends in part on the speed of printing in the first printer 12 or 72 but also depends on the distance between the paper output port 22 or 86 of the first printer 12 or 72 and the paper infeed port 24 or 78 of the second printer 14 or 74. The steps taken to synchronize or time printing operations in the two printers 12, 14 or 72, 74 are included in the core page processing subroutine of FIGS. 10D–10F.

Upon beginning print operations for a job loaded into queue 110 or 112, processor 114 checks on the contents of file page counter 206 at an inquiry 214, as illustrated in FIG. 10A. If the contents are non-zero, processor 114 zeroes the contents in a step 216. Once the contents of file page counter 206 are determined to be zero, the contents are then incremented by one in a step 218. Processor 114 then engages in an inquiry 220 into the contents of record counter 204. If the contents are not zero, the processor resets counter 204 in a step 222. The contents of record counter 204 are then augmented by one in a step 224. Subsequently, processor 114 investigates at 226 the contents of record page counter 208. Non-zero contents are cleared away in a step 228 and the contents of record page counter 208 are then increased by one in a step 230. Processor 114 then makes a check 232 into the contents of an active record page register 234. If the contents of that register are zero, processor 114 increments the contents by one in a step 236. If, however, the contents are determined in check 232 to be non-zero, processor clears register 234 in a step 238 and then proceeds to incrementation step 236. In a final inquiry 240 of the initialization subroutine of FIG. 10C, processor 114 determines whether the contents of a print buffer register 242 are zero. If so, the contents of register 242 are stepped up by one at 244. If not, register 242 is first reset in a step 246.

The contents of register 242 indicate which print buffer A–E of LPT2 buffer registers 122 is currently active, i.e., ready to receive a built-up even-numbered page for temporary storage to implement the delay between printing operations in the first printer 12 or 72, on the one hand, and printing operations in the second printer 14 or 74, on the other hand. During active printing operations, the contents of active LPT2 print buffer register 242 vary from one to four (A through D), where there is a four page delay between printing operations in the two printers. Like counters 204, 206, and 208, registers 234 and 242 are implemented as respective memory cells or locations internal to processor 114.

Upon the proper initialization of counters 204, 206 and 208 and registers 234 and 242, processor 114 proceeds from the initialization subroutine of FIGS. 10A–10C to the core page processing subroutine of FIGS. 10D–10F, as indicated by an encircled letter B in FIG. 10D. Processor 114 first determines at a decision junction 248 whether the numeral stored in encoded form in file page counter 206 is odd or even, indicating whether the current page in the print job is an odd page, to be reproduced by first printer 12 or 72, or an even page, to be reproduced by second printer 14 or 74. If the current page in the print job is odd, as determined by processor 114 at decision junction 248, processor 114 executes a step 250 in which it accesses active record page register 234 to identify the active record page and transfers that page from the active input queue 110 or 112 (FIG. 5) to a page build buffer 252 realized in internal processor memory. Processor 114 builds the page at 254 and then queries at 256 whether the contents of the record page counter are unity. If so, processor 114 performs a step 258 in which it accesses internal memory area 210 to obtain standard first page text and graphics and then merges the active record page data with the standard first page text and graphics in the build page buffer 252. Subsequently, processor 114 moves the contents of page build buffer 252 to LPT1 print buffer 120 (FIG. 5) in a step 260 and clear the page build buffer in a step 262. Processor 114 then checks at 264 whether the contents of file page counter 206 are greater than 8. If the file page counter contents are 8 or less, then the second printer has not yet started its printing operations on the current print job. Processor 114 then increments file page counter 206 in a step 266 and investigates at 268 whether the end of the current record has been reached. If not, the processor increments record page counter 208 in a step 270 and proceeds to initial print operations depicted in FIGS. 10J–10K, as indicated by an encircled letter D in FIGS. 10F and 10J.

If processor 114 determines at check 264 that the number encoded in file page counter 206 is greater than 8, the processor enters into the printing subroutine of FIGS. 10L–10N, as indicated by an encircled letter E in FIGS. 10F and 10L. If processor 114 determines at investigation 268 that the end of the current record has been reached, the processor executes the subroutine of FIGS. 10G–10I, as indicated by an encircled letter C in FIGS. 10F and 10G.

If the contents of file page counter 206 are even, as determined by processor 114 at decision junction 248, processor 114 executes a step 272 in which it accesses active record page register 234 to identify the active record page and transfers that page from the active input queue 110 or 112 (FIG. 5) to page build buffer 252. Processor 114 builds the page in a step 274 and then, in a step 276, checks the contents of internal memory register 242 and moves the contents of the active buffer A–D of LPT2 print buffer registers 122 (FIG. 5) to the fifth print buffer (E) of LPT2 print buffer registers 122. In subsequent steps 278 and 280, processor 114 moves the contents of the page build buffer 252 to the active buffer A–D of LPT2 print buffer registers 122 and clears page build buffer 252. Processor 114 then increments the contents of internal memory register 242 in a step 282. However, if the active LPT2 print buffer register of registers 122 is buffer D (#4), as determined by processor 114 at a decision junction 284, the processor first zeroes the contents of internal memory register 242 in a step 286. Processor 114 then checks at 288 whether the contents of file page counter 206 are greater than 8. If the file page counter contents are 8 or less, then the second printer has not yet started its printing operations on the current print job. Processor 114 then increments file page counter 206 in a step 290 and investigates at 292 whether the end of the current record has been reached. If not, the processor increments record page counter 208 in a step 294 and returns to decision junctions 248.

If processor 114 determines at check 288 that the number encoded in file page counter 206 is greater than 8, the processor enters into the printing subroutine of FIGS. 10L–10N, as indicated by an encircled letter E at an affirmative outcome of check 288. If processor 114 determines at investigation 292 that the end of the current record has been reached, the processor executes the subroutine of FIGS. 10G–10I, as indicated by an encircled letter C in FIGS. 10F and 10G.

At the beginning of the end-of-record processing subroutine of FIG. 10G, processor 114 decides at a junction 296 whether the current page of the print job, as indicated by the contents of file page counter 206, is an odd page or an even page. It is to be understood that current page is a blank page, the last data page of the current record having been processed already. If the contents of file page counter 206 indicate an even page number (a back side of a sheet), processor 114 moves text and graphics of a standard final page from internal memory area 212 to page build buffer 252 in a step 298, builds the page in a step 300 and then, in a step 302, accesses register 242 to determine which buffer A–D is active and moves the contents of that buffer to print buffer E (#5) of LPT2 print buffer registers 122 (FIG. 5). Subsequently, in a step 304, processor 114 moves the contents of page build buffer 252 to the active buffer of LPT2 print buffer registers 122 (FIG. 5) and, in a step 306, clears page build buffer 252. Processor 114 again accesses internal memory register 242 in an inquiry 308 to ascertain whether the active buffer A–D of LPT2 print buffer registers 12 is the last one (D). If not, the contents of register 242 are incremented in a step 310. If so, the contents of register 242 are first cleared in a step 312 prior to incrementation in step 310. Processor 114 then increments file page counter 206 in a step 314, increments record counter 204 in a step 316, clears record page counter 208 in a step 318, and increases the zeroed contents of record page counter 208 to unity in a step 320. Processor 114 then checks at 322 whether the contents of file page counter 206 are greater than 8. If the file page counter contents are 8 or less, then the second printer has not yet started its printing operations on the current print job. Processor 114 then proceeds to initial print operations depicted in FIGS. 10J–10K, as indicated by an encircled letter D in FIGS. 10I and 10J. If processor 114 determines at check 322 that the number encoded in file page counter 206 is greater than 8, the processor enters into the printing subroutine of FIGS. 10L–10N, as indicated by an encircled letter E in FIGS. 10I and 10L.

If processor 114 finds at decision junction 296 that the contents of file page counter 206 are an odd number (a front side of a sheet), the processor moves text and graphics of the standard final page from internal memory area 212 to page build buffer 252 in a step 324, builds the page in a step 326, moves the contents of the page build buffer to LPT1 print buffer 120 (FIG. 5) in a step 328, clears the page build buffer in a step 330, and increment file page counter 206 in a step 332. Processor 114 then accesses another internal memory area 334 and moves a blank page from that memory area to page build buffer 252 in a step 336 and builds the page in a step 338. At that juncture, processor 114 the end-of-record processing subroutine sequence starting with step 302.

In a first inquiry 340 in the printing subroutine of FIG. 10J, processor 114 checks whether the first printer 12 or 72 is ready and makes the printer ready in a step 344, if necessary. Processor 114 then monitors the position of the paper at a query 346 and positions the paper, if required, in a step 348. Subsequently, processor 114 transmits the contents of LPT1 print buffer 120 (FIG. 5) to the first printer 12 (FIG. 1) or 72 (FIG. 4) in a step 350 and transmits a print command to that printer in a step 352. After the transmission of a print command to the first printer 12 or 72 in step 352, processor 114 institutes a check 354 as to whether printing was successful. If so, LPT1 print buffer 120 is cleared in a step 356 and the processor returns to the core page processing subroutine of FIGS. 10D–10F. If not, the first printer 12 or 72 is idled in a step 358, while processor 114 searches for the fault in an investigation 360 and displays an error message regarding the fault in a step 362. After the operator rectifies the printing error, as confirmed by processor 114 in a step 364, the processor returns to the start of printing operations in FIG. 10A, as indicated by an encircled letter A in FIG. 10K.

When utilizing both printers 12 (or 72) and 14 (or 74), processor 114 executes the subroutine of FIGS. 10L–10N. Processor 114 first confirms at 366 whether the first printer 12 or 72 is ready and rectifies the situation in a step 368, if necessary. Processor 114 then verifies the position of the first printer's paper at 370 and locates the paper, if required, in a step 372. In a step 374, processor 114 sends the contents of LPT1 print buffer 120 (FIG. 5) to the first printer 12 or 72. Processor 114 then detects at 376 whether the second printer 14 (FIG. 1) or 74 (FIG. 4) is ready and, in the event that the second printer is not ready, corrects the printer's readiness in a step 378. Once the printer is ready, processor 114 scans the positioning of the paper at a junction 380 and arranges the paper in a step 382, if called for. When the second printer 14 or 74 and its paper are prepared, processor 114 transfers the contents of fifth buffer E of LPT2 print buffers 122 to the second printer in a step 384. Processor 114 then transmits print commands to the two printers in respective steps 386 and 388 and retards the execution of that print command by an interval of a predetermined number of milliseconds (step 390).

In an inquiry 392, processor 114 determines whether printing has been successful. If there is a problem with the printing, the processor executes an error handling subroutine shown in FIGS. 10O–10P. If the printing proceeds as intended, processor 114 makes a check 394 as to whether the last record in the queue 110 or 112 has just been printed and that there are further records in the other print queue 112 or 110. If the check yields an affirmative determination, processor 114 proceeds to the last-record subroutine of FIG. 10O, to switch printing to the other queue. A negative determination at check 394 leads processor 114 to inquire at 396 as to whether the job has been finished, i.e., whether both queues 110 and 112 are empty. If so, processor 114 executes end-of-job processing (FIGS. 10R–10S). If not, processor clears LPT1 print buffer 120 in a step 398 and buffer E of LPT2 print buffers 122 in a step 400.

As illustrated in FIGS. 10O–10P, processor 114 first idles both printers in a step 402 when a printing error or malfunction has been detected. Processor 114 then determines the nature of the fault in a step 404, displays an error message in a step 406, and awaits operator intervention in a step 408. Upon rectification of the error by human intervention, processor 114 queries at 410 whether the printing is being done on continuous form sheets. If continuous sheets are being used, processor 114 first waits in a step 412 for the operator to form feed to the first printer 12 or 72 the equivalent of four blank print forms (where there is a four page delay between the first printer 12 or 72 and the second printer 14 or 74). A message may be displayed at this point to remind the operator of the procedure. If printing is being undertaken on separate sheets, processor 114 waits in a step 414 for the operator to form feed a single print form to the first printer 12 or 72. Again, a message may be displayed at this point to remind the operator of the proper procedure. In subsequent steps 416 and 418, the processor waits while the operator removes and disposes of pages representing records which will be reprocessed and clears and resets both printers. Again, prompts may be provided to the operator to ensure that proper rectification steps are performed.

At a decision junction 420, processor 114 investigates the contents of file page counter 206. If the file page counter contains an odd numeral, processor 114 decrements record counter 204 in a step 422. If the file page counter contains an even numeral, processor 114 first increments file page counter 206 in a step 424. Subsequently, processor 114 sets the contents of record page counter 208 at unity in steps 426 and 428, sets the contents of active record page register 234 at unity in steps 430 and 432, and sets the contents of register 242 at unity in steps 434 and 436. Processor 114 then clears LPT1 print buffer 120 and buffers A–E of LPT2 print buffers 12 in steps 438 and 440 and returns to decision junction 248 at the beginning of the core page processing subroutine in FIGS. 10D–10F.

FIG. 10Q depicts a subroutine for switching from one input queue 110 or 112 to the other during the processing of a single print job. Thus, the last-record subroutine of FIG. 10Q serves to begin a portion of a print job stored in the other input queue 112 or 110 and for loading further print data from a mainframe, etc., 38 into the queue 110 or 112 holding the job portion which has just been printed. Processor 114 makes a check 442 into the state of a memory or software switch 444 to determine whether the second input queue 112 is active, i.e., has been accessed by the processor during a printing operation. If so, processor 114 switches to the first input queue 110 in a step 446, rebuilds or reloads the second input queue 112 in a step 448 and sets a memory or software switch 444 for the second queue 112 to an inactive state in a step 450. If the second input queue 112 is not active, as established at check 442, processor 114 switches to that second queue in a step 452, rebuilds the first input queue 110 in a step 454, and sets memory or software switch 444 to an active state in a step 456.

As illustrated in FIGS. 10R–10S, a subroutine executed at the end of a print job begins with processor 114 accesses record page counter 208 to determine in an inquiry 458 whether the file page number is greater than 8. If so, processor 114 terminates processing operations in a step 460 and displays a message in a step 462 indicating that the job has been finished. If the page number in file page counter 208 is eight or less, processor 114 moves a blank page from internal memory area 334 to page build buffer 252 in a step 464, builds a page at 466, moves the contents of the page build buffer to LPT1 print buffer 120 (FIG. 5) in a step 468, and clears page build buffer 252 in a step 470. Processor 114 then moves the contents of the active print buffer B, C, or D of LPT2 print buffers 122 to buffer E of print buffers 122 in a step 472 and subsequently accesses internal memory register 242 in an investigation 474 to determine whether the active LPT2 print buffer is the fourth buffer D. If so, processor 114 zeroes the active LPT2 print buffer register 242 in a step 476. Processor 114 then increments register 242 in a step 478, and increments record page counter 208 in a step 480. After incrementing the record page counter, processor 114 executes the printing routine of FIGS. 10L–10N.

It is recommended that woven or smooth paper be used, rather than "laid" or textured paper. Paper weight should be at least 20 lb. and the printers will accept 24 to 28 lb. Good results have been obtained with Hammeril Laser 24 lb. bond single sheets and Hewlett-Packard "Z-fold" continuous form stripped of perforated side strips.

Cost savings can be realized by eliminating the letter paper tray, rollers for raising paper from the paper tray, and rollers used to push printed documents out the tops of the printers. Antistatic material, laminates or coatings effective at different humidities can be provided for the various guide surfaces. Japanese patent document No. 116807 discloses such materials with respect to lids and bags.

In the embodiment of FIG. 1 (continuous form sheet feed), one or more photoelectric sensors (not shown) may be provided for monitoring the paper path. Upon a detecting of light, indicating that the paper form has been interrupted, a signal from the photosensor(s) triggers an error condition.

Although the invention has been described in terms of particular embodiments and applications, one of ordinary skill in the art, in light of this teaching, can generate additional embodiments and modifications without departing from the spirit of or exceeding the scope of the claimed invention. For example, it may be possible to print even pages of a document with the first printer 12 or 72 and odd pages with the second printer 14 or 74. Accordingly, it is to be understood that the drawings and descriptions herein are proffered by way of example to facilitate comprehension of the invention and should not be construed to limit the scope thereof.

What is claimed is:

1. A printing assembly comprising:
   a desktop-type first laser printer;
   a desktop-type second laser printer substantially identical to said first laser printer, said first laser printer and said second laser printer each having a paper feed port on one side and a paper output port on a substantially opposite side, said first laser printer and said second laser printer each being disposed in an upright orientation, said second laser printer being disposed below said first laser printer in a reversed orientation relative to said first laser printer so that a printing substrate travels in opposite directions through the two printers, the paper output port of said first laser printer being located substantially vertically above the paper feed port of said second laser printer, the paper feed port of said first laser printer being located substantially vertically above the paper output port of said second laser printer;
   a digital processor operatively connected to data inputs of said first laser printer and said second laser printer, said processor being programmed to detect odd pages and even pages in an electronically encoded document, to separate odd pages from even pages, and to transmit odd pages of said document to said first laser printer and even pages of said document to said second laser printer, said processor being further programmed to synchronize operation of said first laser printer and said second laser printer so that opposite sides of essentially every sheet portion bear consecutive pages; and
   a paper guide disposed between (1) the paper output port of one of the laser printer and (2) the paper feed port of the other of said laser printer for guiding paper from said one of said laser printers to said other of said laser printers.

2. The printing assembly set forth in claim 1 wherein a multiple-page continuous web of paper extends from the paper output port of said one of said laser printers to the paper feed port of said other of said laser printers, said web of paper being simply inverted in a U or C shape between the output port of said one of said laser printers and the paper feed port of said other of said laser printers.

3. The printing assembly set forth in claim 2 wherein said guide means includes a tensioning device for providing a strip of said web between the output port of said one of said laser printers and the paper feed port of said other of said laser printers with a predetermined amount of tension.

4. The printing assembly set forth in claim 3 wherein said tensioning device is spring loaded.

5. The printing assembly set forth in claim 3 wherein said tensioning device places an electrically grounded element in contact with said web.

6. The printing assembly set forth in claim 1 wherein said first laser printer and said second laser printer are modified off-the-shelf components.

7. The printing assembly set forth in claim 1 wherein said one of said laser printers is said first laser printer, said paper including a series of separate paper sheets, said guide means including an arcuate surface extending up from the paper feed port of said second laser printer at least partially to the paper output port of said first laser printer.

8. The printing assembly set forth in claim 7 wherein said guide means further include an opened door at the paper output port of said first laser printer.

9. The printing assembly set forth in claim 1 wherein said processor is programmed to delay page transmission to said other of said first laser printer and said second laser printer by a predetermined number of pages.

10. The printing assembly set forth in claim 9 wherein said processor includes a first page buffer for temporarily storing a document page to be transmitted to said one of said laser printer, said processor further including a plurality of second page buffers one greater in number than said predetermined number for temporarily storing a plurality of document pages to be transmitted to said other of said laser printer.

11. The printing assembly set forth in claim 1 wherein said processor is programmed to generate said document from (1) encoded information peculiar to said document and (2) standard textual and graphic information incorporated into a plurality of documents.

12. The printing assembly set forth in claim 1 wherein said first laser printer is disposed above said second printer so as to be essentially horizontally coextensive therewith, the paper output port of said first laser printer being located approximately directly above the paper feed port of said second laser printer, the paper feed port of said first laser printer being located approximately directly above the paper output port of said second laser printer.

13. A printing assembly comprising:
first printer for printing documents encoded in computer generated digital signals;
a second printer for printing documents encoded in computer generated digital signals, said first printer and said second printer being disposed one above the other in upright and relatively reversed orientations so that paper sheets travel in opposite directions through the two printers and so that paper sheets at a paper output port of said first printer are fed to a paper infeed port of said second printer along a path having exactly one U- or C-shaped portion; and
a computer operatively connected to data inputs of said first printer and said second printer for generating a digital signal encoding a multiple page document and for transmitting odd pages of said multiple page document in encoded form to one of said first printer and said second printer and even pages of said multiple page document to the other of said first printer and said second printer.

14. The printing assembly set forth in claim 13 wherein said first printer is connected in tandem to said second printer via a multiple-page continuous web of paper extending from a paper output port of said first printer to a paper feed port of said second printer, said web of paper being simply inverted in a U or C shape between said output port and said paper feed port.

15. The printing assembly set forth in claim 14 further comprising a tensioning device for providing a strip of said web between said paper output port and said paper feed port with a predetermined amount of tension.

16. The printing assembly set forth in claim 13 wherein said computer is programmed to detect odd pages and even pages in said document, to separate odd pages from even pages, and to time the operation of said first printer and said second printer so that opposite sides of essentially every printed sheet portion bear consecutive pages.

17. The printing assembly set forth in claim 13 wherein said computer is programmed to delay page transmission to said other of said first laser printer and said second laser printer by a predetermined number of pages.

18. The printing assembly set forth in claim 17 wherein said computer includes a first page buffer for temporarily storing a document page to be transmitted to said one of said first laser printer and said second laser printer, said processor further including a plurality of second page buffers one greater in number than said predetermined number for temporarily storing a plurality of document pages to be transmitted to said other of said first laser printer and said second laser printer.

19. The printing assembly set forth in claim 13 wherein said processor is programmed to generate said document from (1) encoded information peculiar to said document and (2) standard textual and graphic information incorporated into a plurality of documents.

20. The printing assembly set forth in claim 13 wherein said first printer and said second printer are substantially identical off-the-shelf components.

* * * * *